United States Patent [19]

Ritchie, Jr. et al.

[11] Patent Number: 5,790,523

[45] Date of Patent: *Aug. 4, 1998

[54] TESTING FACILITY FOR A BROADBAND COMMUNICATIONS SYSTEM

[75] Inventors: John A. Ritchie, Jr., Duluth, Ga.; Steve Idler, Bolingbrook, Ill.; Gregory T. Dubberly, Atlanta, Ga.

[73] Assignee: Scientific-Atlanta, Inc., Norcross, Ga.

[*] Notice: The term of this patent shall not extend beyond the expiration date of Pat. No. 5,581,555.

[21] Appl. No.: 690,628

[22] Filed: Jul. 31, 1996

Related U.S. Application Data

[63] Continuation-in-part of Ser. No. 475,220, Jun. 7, 1995, Pat. No. 5,581,555, which is a continuation-in-part of Ser. No. 219,848, Mar. 30, 1994, Pat. No. 5,594,726, which is a continuation-in-part of Ser. No. 123,363, Sep. 17, 1993, Pat. No. 5,499,241.

[51] Int. Cl.⁶ .................................................. H04J 1/16
[52] U.S. Cl. ........................ 370/241; 370/487; 455/3.1
[58] Field of Search .......................... 370/241, 242, 370/485, 486, 487; 379/1, 2; 348/181, 192, 6; 455/67.1, 67.4, 5.1, 6.1, 6.3, 3.1, 2, 3.2, 4.2; 371/20.1, 20.4; 375/224; 340/500, 514; 395/180

[56] References Cited

U.S. PATENT DOCUMENTS

| | | |
|---|---|---|
| 2,891,217 | 6/1959 | Grieg et al. . |
| 3,821,648 | 6/1974 | Campbell . |
| 3,825,835 | 7/1974 | Hammett et al. . |
| 3,875,328 | 4/1975 | Gibson et al. . |
| 4,246,608 | 1/1981 | Baker . |
| 4,628,360 | 12/1986 | Mook et al. . |
| 4,714,873 | 12/1987 | McPherson et al. . |
| 4,799,213 | 1/1989 | Fitzgerald ........................ 370/241 |
| 4,873,574 | 10/1989 | Darby . |
| 4,918,373 | 4/1990 | Newberg . |
| 5,073,822 | 12/1991 | Gumm et al. . |
| 5,337,014 | 8/1994 | Najle et al. . |
| 5,341,399 | 8/1994 | Eguchi . |
| 5,469,495 | 11/1995 | Beveridge ........................ 379/56 |
| 5,473,361 | 12/1995 | Penney . |
| 5,491,508 | 2/1996 | Friedell et al. . |
| 5,592,540 | 1/1997 | Beveridge ........................ 379/189 |
| 5,615,246 | 3/1997 | Beveridge ........................ 379/56 |

Primary Examiner—Ajit Patel
Attorney, Agent, or Firm—Kenneth M. Massaroni; Kelly A. Gardner; Hubert J. Barnhardt, III

[57] ABSTRACT

A test system for evaluating the operating state of a headend of a broadband communications network for communicating telephony signals between a telephony system and subscribers of communications services. Modulators at the headend transmit telephony signals in the forward band of the broadband communications network. The forward telephony channels are demodulated and demultiplexed by a plurality of subscriber terminals into individual telephony signals directed to an addressed subscriber. Signals returning from subscribers are digitized into standard telephony signals onto the reverse band of the broadband communications network, and demodulated by demodulators of the headend into a standard telephony signal that is interfaced to the telephony network. The test system evaluates the operating state of a selected demodulator of the headend by modulating a carrier with a predetermined data pattern to generate a upstream test signal. The upstream test signal is transmitted to the selected demodulator, which responds by outputting a detected upstream test signal. The test system compares the detected upstream test signal to the data pattern to generate error measurements that support an evaluation of the operating state of the selected demodulator. For an ingress test, the upstream signals present on the selected upstream channel are combined with the upstream test signal, and this signal combination is analyzed to determine the status of the selected upstream channel and the selected demodulator. The test system evaluates the operating state of a selected modulator of the headend in response to receiving a downstream test signal generated by the selected modulator. The test system outputs a detected downstream test signal in response to the downstream test signal. In turn, the test system conducts error measurements in response to the detected downstream test signal that support an evaluation of the operating state of the selected modulator.

34 Claims, 18 Drawing Sheets

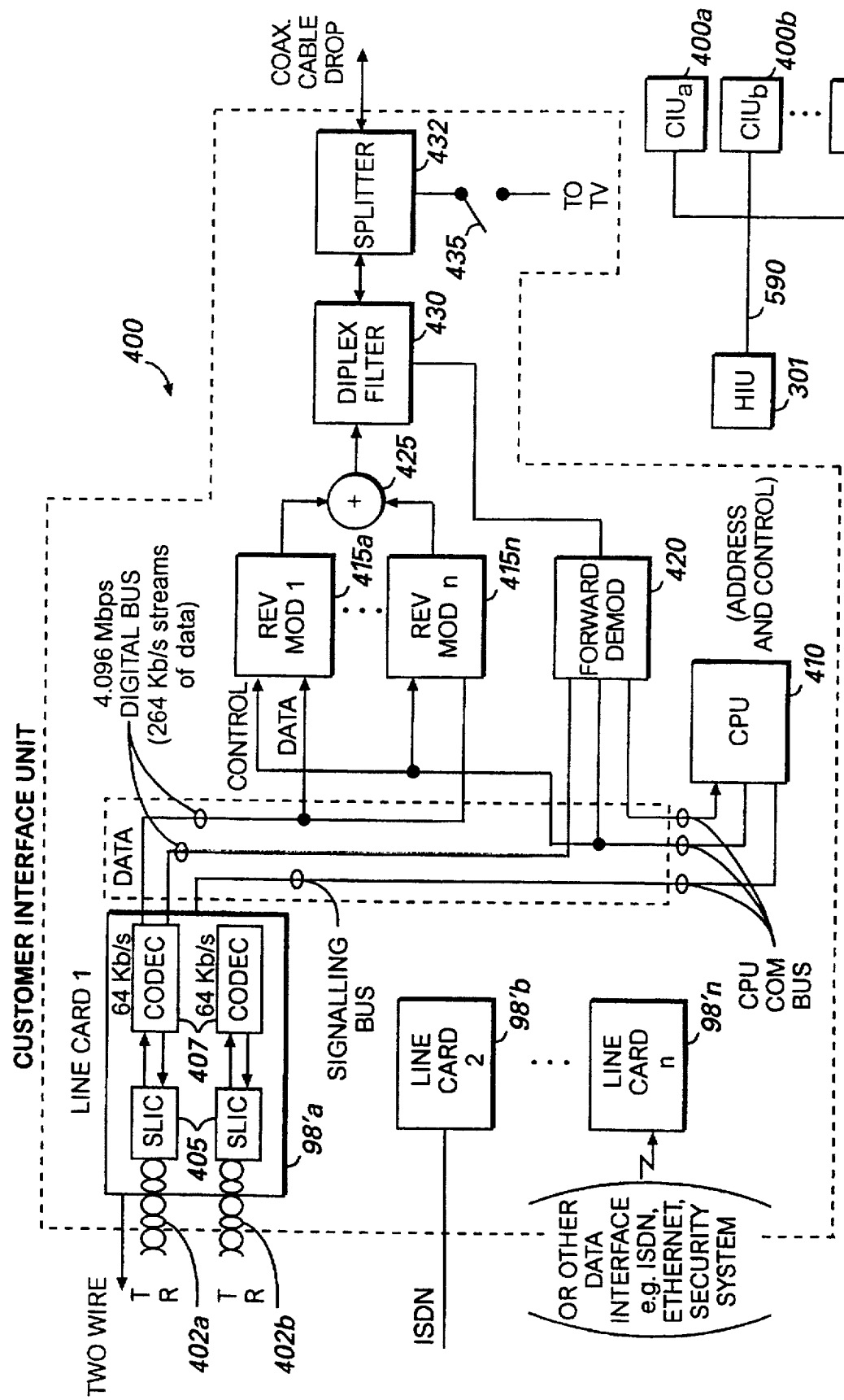

FIG. 10C

Order of Transmission

Downstream Framing Structure (Subframe)

| COL ⇒<br>ROW ⇓ | 1 | 2 | 3 | 4 | 5 | 6 | 7 | 8 | 9 |
|---|---|---|---|---|---|---|---|---|---|
| 0-8<br>1 | 0<br>1.1 | 1<br>2.1 | 2<br>3.1 | 3<br>1.2 | 4<br>2.2 | 5<br>3.2 | 6<br>1.3 | 7<br>2.3 | 8<br>3.3 |
| 9-17<br>2 | 9<br>1.4 | 10<br>2.4 | 11<br>3.4 | 12<br>1.5 | 13<br>2.5 | 14<br>3.5 | 15<br>1.6 | 16<br>2.6 | 17<br>3.6 |
| 18-26<br>3 | 18<br>1.7 | 19<br>2.7 | 20<br>3.7 | 21<br>1.8 | 22<br>2.8 | 23<br>3.8 | 24<br>STUFF | 25<br>DIR-1 | 26<br>DIR-2 |
| 27-35<br>4 | 27<br>1.9 | 28<br>2.9 | 29<br>3.9 | 30<br>1.10 | 31<br>2.10 | 32<br>3.10 | 33<br>1.11 | 34<br>2.11 | 35<br>3.11 |
| 36-44<br>5 | 36<br>1.12 | 37<br>2.12 | 38<br>3.12 | 39<br>1.13 | 40<br>2.13 | 41<br>3.13 | 42<br>1.14 | 43<br>2.14 | 44<br>3.14 |
| 45-53<br>6 | 45<br>1.15 | 46<br>2.15 | 47<br>3.15 | 48<br>1.16 | 49<br>2.16 | 50<br>3.16 | 51<br>ABCD-1 | 52<br>ABCD-2 | 53<br>ABCD-3 |
| 54-62<br>7 | 54<br>1.17 | 55<br>2.17 | 56<br>3.17 | 57<br>1.18 | 58<br>2.18 | 59<br>3.18 | 60<br>1.19 | 61<br>2.19 | 62<br>3.19 |
| 63-71<br>8 | 63<br>1.20 | 64<br>2.20 | 65<br>3.20 | 66<br>1.21 | 67<br>2.21 | 68<br>3.21 | 69<br>1.22 | 70<br>2.22 | 71<br>3.22 |
| 72-80<br>9 | 72<br>1.23 | 73<br>2.23 | 74<br>3.23 | 75<br>1.24 | 76<br>2.24 | 77<br>3.24 | 78<br>V.5.1 | 79<br>DFA-2/<br>DFC/<br>CRC | 80<br>DFA-1 |

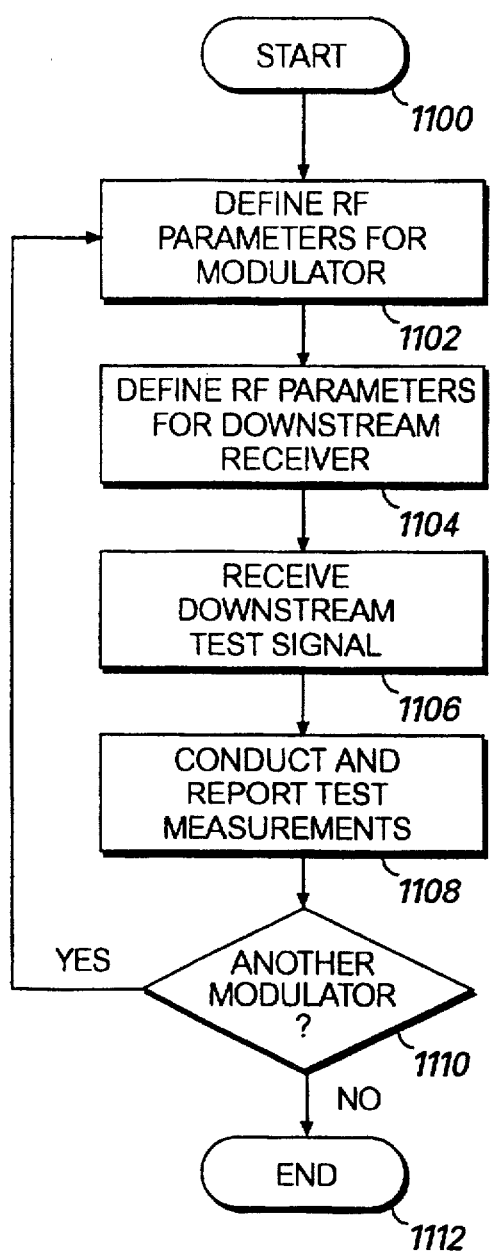
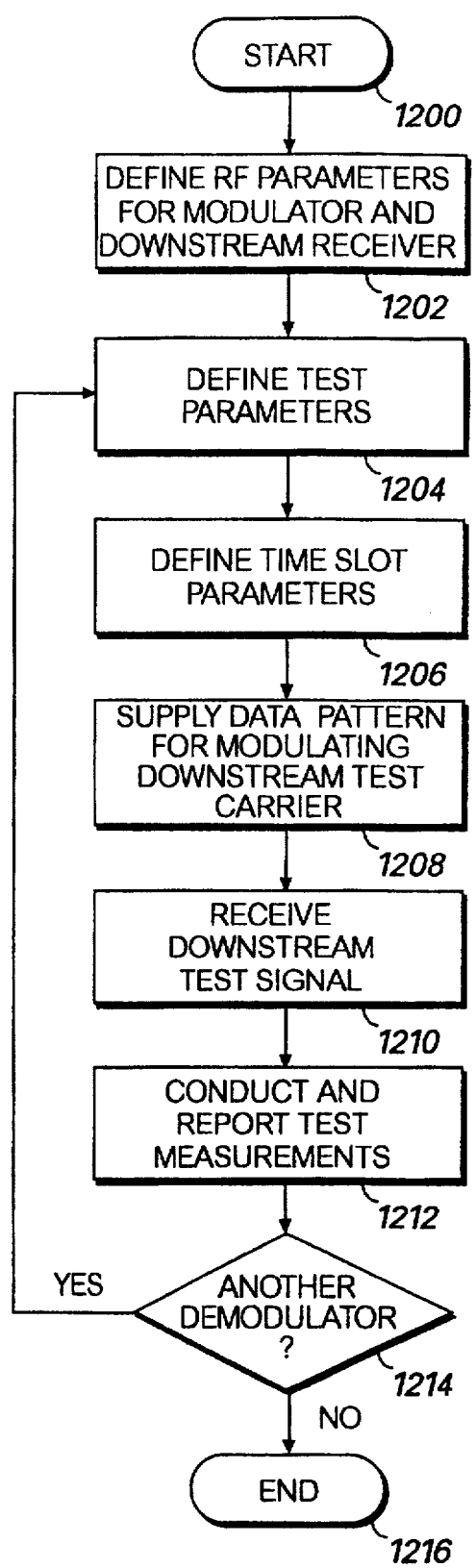
FIG. 16  FIG. 17

TESTING FACILITY FOR A BROADBAND COMMUNICATIONS SYSTEM

CROSS REFERENCE TO RELATED APPLICATIONS

This application is a continuation-in-part of U.S. patent application Ser. No. 08/475,220, filed Jun. 7, 1995, now U.S. Pat. No. 5,581,555, entitled "Reverse Path Allocation and Contention Resolution Scheme for a Broadband Communications System", a continuation-in-part of application Ser. No. 08/219,848, filed Mar. 30, 1994, now U.S. Pat. No. 5,594,726, entitled "Frequency Agile Broadband Communications System", which is a continuation-in-part of application Ser. No. 08/123,363, filed Sep. 17, 1993, now U.S. Pat. No. 5,499,241, entitled "Broadband Communications System".

FIELD OF THE INVENTION

The system pertains generally to broadband communications systems, such as cable or community antenna television (CATV) networks, and is more particularly directed to a test facility for a system for communicating telephony signals, and other or similar signals, over CATV and equivalent communications networks.

BACKGROUND OF THE INVENTION

Cable television systems, sometimes referred to as community-antenna television (CATV) systems, are broadband communications networks of coaxial cable and optical fiber that distribute television, audio, and data signals to subscriber homes or businesses. In a typical CATV system, a single advantageously located antenna array feeding a cable network supplies each individual subscriber with a usable television signal.

Since the pioneer days, cable networks have experienced enormous growth and expansion in the United States, particularly in urban networks. It is estimated that CATV networks currently pass approximately 90% of the population in the United States, with approximately 60-65% of all households actually being connected. While cable systems originally had very simple architectures and provided a limited number of different television signals, the increase in the number of television broadcasters and television owners over the last several decades has resulted in much more complex and costly modern cable distribution systems.

A typical CATV system comprises four main elements: a headend, a trunk system, a distribution system, and subscriber drops. The "headend" is a signal reception and processing center that collects, organizes and distributes signals. The headend receives satellite-delivered video and audio programming, over-the-air broadcast TV station signals, and network feeds delivered by terrestrial microwave and other communication systems. In addition, the headend may inject local broadcasting into the package of signals sent to subscribers such as commercials and live programming created in a studio.

The headend contains signal-processing equipment that controls the output level of the signals and suppresses undesired out-of-band signals. Typical signal-processing equipment includes a heterodyne processor or a demodulator-modulator pair. The headend then modulates received signals onto separate radio frequency (RF) carriers and combines them for transmission over the cable system.

The "trunk system" is the main artery of the CATV network that carries the signals from the headend to a number of distribution points in the community. A modern trunk system typically comprises of a combination of coaxial cable and optical fibers with trunk amplifiers periodically spaced to compensate for attenuation of the signals along the line. Such modern trunk systems utilizing fiber optics and coaxial cable are often referred to as hybrid "fiber/coax" or "HFC" systems.

The "distribution systems" utilize a combination of optical fibers and coaxial cable to deliver signals from the trunk system into individual neighborhoods for distribution to subscribers. In order to compensate for various losses and distortions inherent in the transmission of signals along the cable network, line-extender amplifiers are placed at certain intervals along the length of the cable. Each amplifier is given just enough gain to overcome the attenuation loss of the section of the cable that precedes it. A distribution network is also called the "feeder".

There is a strong desire in the CATV and telecommunications industry to push optical fiber as deeply as possible into communities because optical fiber offers the significant advantage of low attenuation of signals carried by this medium. Due to technological and economic limitations, it has not yet proved feasible to provide fiber to the subscriber's home. Present day "fiber deep" CATV distribution systems including optical fibers and coaxial cable are often called "Fiber-To-the-Serving-Area" or "FTSA" systems.

"Subscriber drops" are taps in the distribution system that feed individual 75Ω coaxial cable lines into subscribers' television sets or subscriber terminals, often referred to as "subscriber premises equipment" or "customer premises equipment" ("CPE"). Since the tap is the final service point immediately prior to the subscriber premises, channel authorization circuitry is often placed in the tap to control access to scrambled or premium programming.

Cable distribution systems were originally designed to distribute television and radio signals in the "downstream" direction only (i.e., from a central headend location to multiple subscriber locations, also referred to as the "forward" path). Therefore, the component equipment of many older cable systems, which includes amplifiers and compensation networks, is typically adapted to deliver signals in the forward direction only. For downstream transmissions, typical CATV systems provide a series of video channels, each 6 MHz in bandwidth, which are frequency division multiplexed across the forward band, in the 50 MHz to 550 MHz region of the frequency spectrum. As fiber is moved more deeply into the serving areas in fiber/coax and FTSA configurations, the bandwidth of the coax portion is expected to increase.

The advent of pay-per-view services and other interactive television applications has fueled the development of bidirectional or "two-way" cable systems that also provide for the transmission of signals from the subscriber locations back to the headend. This is often referred to as the "upstream" direction or the "reverse" path. This technology has allowed cable operators to provide many interactive subscriber services on the network, such as impulse-pay-per-view (IPPV). In many CATV systems, the band of signals from 5 MHz to 30 MHz is used for reverse path signals.

In the traditional tree and branch cable network, a common set of downstream signals are distributed to every subscriber home in the network. Upstream signals flowing from a single subscriber toward the headend pass by all the other upstream subscriber homes on the segment of distribution cable that serves the neighborhood.

Present day FTSA systems facilitate the communication of signals in the reverse direction by dividing the subscriber base of a cable network into manageable serving areas of approximately 125–2500 subscribers. This allows for the reuse of limited reverse band frequency ranges for smaller groups of subscribers. The headend serves as the central hub of a star configuration to which each serving area is coupled by an optical communications path ending in a fiber node. The fiber node is connected to the serving area subscribers over a coaxial cable distribution sub-network of feeders and drops in each serving area. In the FTSA configuration, some of the signals in the forward direction (e.g., television program signals) are identical for each serving area so that the same subscriber service is provided to all subscribers. In the reverse direction, the configuration provides an independent spectrum of frequencies confined to the particular serving area. The FTSA architecture thus provides the advantage of multiplying the bandwidth of the reverse portions of the frequency spectrum times the number of serving areas.

The ever-expanding deployment of fiber optic technology in CATV systems across the country has cable operators looking to provide a whole new range of interactive services on the cable network. One area that is of particular interest is telephony service. Because of recent advances in technology as well as the loosening of regulations, the once distinct lines between the cable television network and the telephone network have blurred considerably. Currently there is a great demand for a broadband communication system that can efficiently provide telephone service over the existing cable distribution network.

Moreover, there is substantial interest expressed by telephone system operating companies in the idea of increased bandwidth for provision of new services to telephone subscribers, such as television; interactive computing, shopping, and entertainment; videoconferencing, etc. Present day "copper" based telephony service (so called because of the use of copper wires for telephone lines) is very bandwidth limited—about 4 kHz—and cannot provide for such enhanced services by the telephone companies without massive changes to the telephone networks infrastructure.

Existing communications systems, however, have not proven to be well suited for the transmission of telephony signals on the cable network. For example, CATV systems do not have the switching capabilities necessary to provide point to point communications. A communications system for the transmission of telephony signals must therefore be compatible with the public switched telephone networks ("PSTN") operated by the telephone operating companies. To be useful in the carriage of telephony signals, a CATV network must be able to seamlessly interface to a telephony network at a point where it is commercially viable to carry telephony signals. It must also provide signals that can pass to other parts of the interconnected telephone systems without extensive modulation or protocol changes to thereby become part of the international telephone system.

Also, a system for transmitting telephony signals must be configured to allow single point to single point distribution (i.e., from a single subscriber to a single subscriber). However, unlike the telephone companies with their well-established national two-way networks, the cable industry is fragmented into thousands of individual systems that are generally incapable of communicating with one another. The cable network is instead ideally configured for single point to multiple point signal transmission (i.e., from a single headend downstream to multiple subscriber locations).

Indeed, the standard tree and branch topology of CATV systems has not proven to be well suited for sending signals from each subscriber location back to the headend, as is required for bidirectional communication services. Tree and branch cable distribution systems are the most efficient in terms of cable and distribution usage when signals have to be distributed in only the downstream direction. A cable distribution system is generally a very noisy environment, especially in the reverse path. Interfering signals may originate from a number of common sources, such as airplanes passing overhead or from Citizens Band (CB) radios that operate at a common frequency of 27 MHz, which is within the typical reverse channel bandwidth of CATV networks. Since the reverse direction of a tree and branch configuration appears as an inverted tree, noise is propagated from multiple distribution points to a single point, the headend. Due to the single point to multiple point configuration (tree and branch) of the CATV network, upstream transmissions of telephony signals have to contend with multiple noise sources as the branch signals from each subscriber are merged together toward the headend. Therefore, all of the individual noise contributions collectively add together to produce a very noisy environment and a communications problem at the headend.

Therefore, there is a need for a broadband communications system that is compatible with the existing public switched telephone networks, and that is not sensitive to noise or other interference issues, particularly in the reverse path. Moreover, there is a need for a testing system at the headend to evaluate the upstream signal spectrum and to determine the effects of possible interference signals upon the upstream transmission of telephony signals. There is also a need to evaluate the present operating states of the receivers and transmitters at the headend of the telephony network. The present invention addresses these needs by providing a testing facility to determine the health of transmitting and receiving devices at the headend.

SUMMARY OF THE INVENTION

The present invention is generally directed to a test system for a broadband communications system, including bidirectional telephony communications, over a cable distribution network. The broadband communications system provides an integrated CATV/telephony system that is compatible with today's public switched telephone networks and can also deliver video, data, security monitoring, and other services without affecting current in-home wiring or equipment. The broadband communications system can communicate telephony signals from a telephony network to the CATV subscribers in the forward band of the cable network and communicating telephony signals from the CATV subscribers to the telephony network in the reverse band of the cable network.

At a headend of the broadband communications system, individual subscriber telephony signals can be digitized into a multiplexed signal that is carried on a frequency division multiplexed (FDM) carrier in the forward band of the cable network. The digital multiplexed signal is quadrature partial response (QPR) modulated by a modulator on a carrier which is positioned in an otherwise unused portion of the CATV network forward band. Although the QPR signal is approximately 3 MHz in bandwidth and easily fits in a standard 6 MHz video channel, it will be appreciated that a pair of the QPR signals also can be placed in an otherwise unused channel in the cable line to utilize approximately 6 MHz of bandwidth. By making a system which uses a robust digital signal, the bandwidth of the forward CATV band can be efficiently allocated. The system operator can plan and change these allocations on a flexible basis as new services are made available or old services are taken off line.

The subscriber telephony signals to the telephony network are digitized and individually modulated on a carrier in the reverse band of the CATV system. As an illustrated example, a subscriber DS0 telephony line is QPSK modulated into an approximately 50 kHz bandwidth signal (e.g. 49.5 kHz) and frequency division multiplexed on the reverse band of the CATV network. The individual telephony signals are multiplexed into a standard time-division multiplexed (TDM) telephony signal which can be adapted to couple directly into a SONET port or other standard telephony connection, such as a DS1, DS2, or DS3 format signal, of the telephony network.

A need for a test system of the broadband communications system arises because the spectrum characteristics of the signal path between the subscriber and the headend are not predictable. This lack of predictability for the communications medium is a result of the possible introduction of interference and noise signals on this uncontrollable signal path. The testing facility provided by the present invention supports an evaluation of the upstream signal spectrum and a determination of the health of transmitting and receiving devices at the headend.

To determine the vulnerability of a selected reverse channel, which is also called an upstream channel or path, to interference signals, it is useful to inject a combination of a known test signal and present reverse channel signal(s) into a selected demodulator at the headend. The test system can compare the information resulting from the modulation of this combination of the known test signal and the present reverse channel signal to the information that one would expect to receive at the output of the selected demodulator. If the selected demodulator detects the known test signal, which is generated by the test system, with minimal distortion, then this test result suggests that the demodulator is properly operating. This type of upstream test, which is called an ingress test, determines the operating state of the selected demodulator based on the amount of distortion associated with the detected known test signal. This ingress test also provides evidence of the amount of interference for a particular reverse channel during the time of the test. For example, if a reverse channel is associated with a high level of interference, it would be desirable to retune the selected demodulator to another reverse channel that may be free of interference. Thus, the test system supports a measurement of the effect of ingress on a selected demodulator at the headend.

Another type of upstream test involves the injection of only an upstream test signal into a selected demodulator. This test is useful for evaluating the health of the selected demodulator. For example, an upstream test signal having a known signal characteristic can be injected into the selected demodulator. In turn, the test information associated with the detection of the upstream test signal by the selected demodulator can be compared to the known characteristic of the upstream test signal. Based on a quality threshold, a determination can be made regarding the operating state of the selected demodulator. The test is commonly called a "return to service" test because it is typically used to examine the present operating state of a demodulator that had previously entered a fault state. Significantly, the return to service test does not generate any information regarding interference conditions for the upstream signal path that may be connected to the selected demodulator.

With respect to downstream test operations, the test system can support an evaluation of the quality of the downstream transmit signal output by a selected modulator at the headend. In the event that the downstream signal received by the test system, does not satisfy a predetermined quality threshold, a determination can be made that the selected modulator has entered a fault state. Based on this determination, a replacement unit can be substituted for the failed modulator.

For an upstream test, the test system evaluates the operating state of a selected demodulator at the headend by modulating a carrier with a predetermined data pattern, such as a Pseudo-Random Bit Sequence (PRBS) pattern (or another data sequence) to generate a upstream test signal. The upstream test signal is transmitted to the selected demodulator, which responds by outputting a detected upstream test signal. The test system compares the detected upstream test signal to the known data pattern to generate error measurements that support an evaluation of the operating state of the selected demodulator. Based on these error measurements, a database, which contains records of the operating state of each demodulator, can be updated.

For a downstream test, the test system evaluates the operating state of a selected modulator at the headend in response to receiving a downstream test signal generated by the selected modulator. The test system outputs a detected downstream test signal in response to the downstream test signal. In turn, the test system conducts error measurements based on the information of the detected downstream test signal to support an evaluation of the operating state of the selected modulator. A database containing records of the operating state of modulators at the headend can be updated based on these error measurements.

Measurement results for upstream and downstream tests are generally defined by the number of errored seconds, i.e., the number of seconds in which an error occurred, the number of bit errors for a predetermined test interval, and the bit error rate (BER). BER can be defined by a ratio of the number of bits in error to the total number of bits in the data stream. Based on the generation of a known bit sequence, an error can be detected during test operations by comparing the known data sequence to the received data sequence. In the event that the error count exceeds a predetermined threshold within a predetermined time period, a determination can be made that a fault condition exists. For example, for an upstream test, the corresponding upstream channel may be excessively noisy or the selected demodulator under test has failed. For a downstream test, an excessive error count or rate indicates that the modulator under test has failed. If the error count or rate is acceptable, then there is no need to replace a demodulator or a modulator with a protection module or to retune one of these units. On the other hand, in response to a determination that the error count exceeds the predetermined threshold, it may be necessary to take a corrective action.

In summary, the test system provided by the present invention supports two primary test functions: (1) testing the operating state of equipment located at the headend of a broadband communication system, such as the modulator and demodulators at the headend, and (2) collecting data to determine the status and availability of an upstream RF channel or path. This evaluation of the upstream RF path is a measurement of the communications channel based on the equipment at the head-end. In other words, the present invention offers the advantage of measuring the effect of interference, such as ingress, in the upstream RF path.

In view of the foregoing, it is an object of the present invention to provide a test system for evaluating the operating state of the headend of a broadband two-way communications system.

It is another object of the present invention to provide a test system for conducting an ingress test to determine the status and availability of a reverse channel, also called an upstream path, based on the amount of interference for the selected channel during the test period.

It is another object of the present invention to provide a test system for generating an upstream test signal for testing a selected demodulator of the headend of a broadband communications system.

It is yet another object of the present invention to provide a test system for receiving a downstream test signal for testing a selected modulator of a broadband communications system.

These and other objects, features and advantages of the invention will be better understood and more fully appreciated if a reading of the following detailed description is undertaken in conjunction with the appended drawings and claims.

BRIEF DESCRIPTION OF THE DRAWINGS

FIG. 8 is a detailed block diagram of a customer interface unit (CIU) constructed in accordance with an embodiment of the broadband communications system.

FIG. 9 is a block diagram showing the communications data link between the HIU and CIUs of FIGS. 7 and 8.

FIG. 10C is a pictorial representation of the framing protocol or data format (subframe) of the downstream path signals utilized in an embodiment of the broadband communications system.

FIG. 16 is a logical flow diagram illustrating the steps for a process of conducting an downstream test for an embodiment of the present invention.

FIG. 17 is a logical flow diagram illustrating the steps for a process of conducting an alternative downstream test for an embodiment of the present invention.

DETAILED DESCRIPTION

Figure 1:
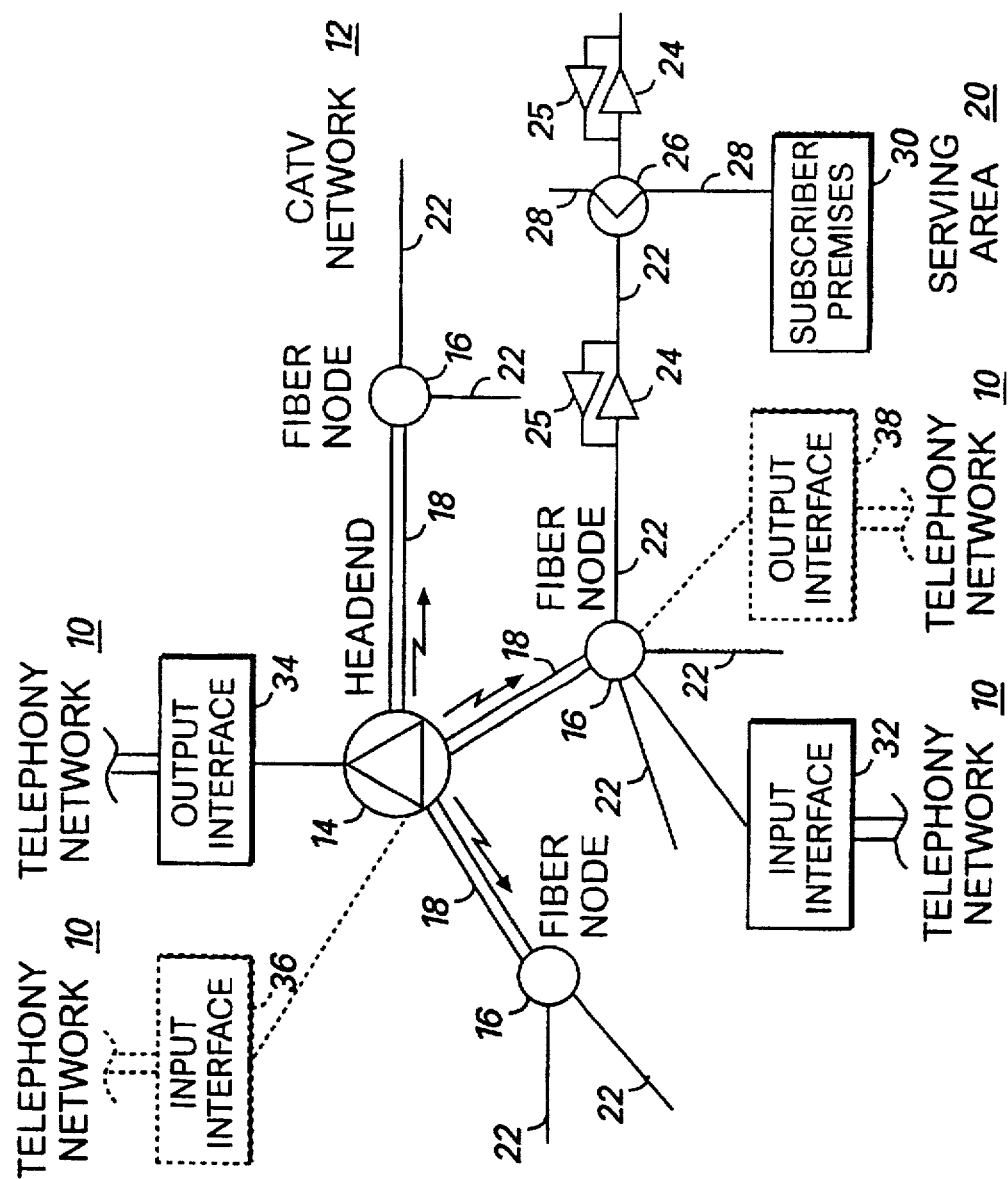
FIG. 1 is a system block diagram of a broadband telephony system.

The present invention provides testing equipment for a broadband communications system including digital communications, telephony, and telephony-related services by utilizing a CATV system in an efficient manner, while not requiring extensive switching equipment and a redesign of such systems. There are two types of telephony calls in the broadband communications system, where one is an incoming call and the other is a outgoing call. With combinations of these types of calls, all the necessary connections to or from another telephony set and to or from a CATV network subscriber can be made. The subscriber may call (or be called by) another subscriber within the CATV network system, may call (or be called by) a local telephone set within the local area of the telephone network, or may call (or be called by) the telephone network to interface to the long distance and international telephony systems.

For a 1:1 configuration, commonly described as a "nailed-up" configuration, an incoming call is directed to a particular subscriber of the CATV network by the telephony network recognizing that the call is directed to one of the group of subscribers belonging to the CATV network. The call is then switched by the telephony network to the OC-1 or other standard telephony signal coupled to the CATV network in the time slot assigned to that subscriber. The addressing and control system of the CATV network then decodes the multiplexed information and translates it into a frequency and time position in the forward multiplex that has been assigned to the particular subscriber. The addressing and control system further provides the necessary control for causing the subscriber equipment to ring or alert the subscriber of an incoming call.

The telephony network and CATV network maintain the connection until there is an indication of an "on hook" signal by one of the parties or another signal that indicates that the communication is complete, such as an end of message data pattern or the like. What is meant by maintaining the connection is that the telephony network continues to place the called party's data packets into the assigned DS0 position in the standard telephony signal and the broadband communications system continues to convert them to the location and frequency in the forward multiplex that is directed to the particular subscriber.

For outgoing calls, the telephony network recognizes from the DS0 position in the standard telephony signal which data packet belongs to a particular originating subscriber of the CATV network. This is an assigned position and the CATV system converts data on whatever carrier frequency is input to the demodulators to that assigned position in the reverse multiplex. Therefore, for outgoing calls the telephony network will consider the standard telephony signal as a group of individual DS0 signals, whose location in the reverse multiplex identifies the originating subscriber.

It will be understood that the present invention can support a "concentration" configuration, also known as a 1:N configuration, to support the communication of incoming and outgoing calls.

With respect now to FIG. 1, there is shown a broadband communications system that defines the operating environment for the present invention, which is generally directed to a testing facility for evaluating selected components of the broadband communications system. The broadband communications system will be described in connection with the communications of telephony signals, but it will be evident that other signals of similar or equivalent types can also be used. Further, while digital telephony signals are described, the system is also capable of communicating analog telephony signals or other types of digital signals. Telephony signals from the telephony network are coupled to the CATV network 12 and are communicated over the CATV network to an addressed subscriber premises 30. The addressed subscriber 30 communicates telephony signals back over the CATV network 12 which are then coupled to the telephony network 10. The system serves as an extension of the telephony network 10 where subscribers can call out to the telephony network 10 or receive calls from the telephony network. This service is in addition to the conventional video, audio, data and other services provided to each subscriber by the CATV network 12.

By "headend", we do not mean to be limited to a conventional coaxial CATV headend such as 14, but also consider that an optical fiber node such as 16 or other communication node that can serve the functions of receiving multiplexed communication signals from a source of signals, such as a telephony central office, and communicating such signals to subscribers in the broadband network. As will be seen in the following discussion, a CATV headend 14 is the preferred embodiment for effecting these functions.

An implementation of the broadband communications system is illustrated in FIG. 1. Although the broadband communications system is generally viewed as an RF transport medium, it will be appreciated that it can transport television signals, FM radio, digital audio, status monitoring signals, and other services, including telephony signals. The system includes the telephony network 10 which interfaces through an input interface 32 to the CATV network 12. The CATV network 12 further interfaces with the telephony network 10 through an output interface 34. Telephony signals are communicated to subscribers of the CATV network 12 through the input interface 32 to a subscriber premises 30. Telephony signals from the subscriber premises 30 of the CATV network 12 are communicated over the CATV network 12 and through the output interface 34 to the telephony network 10. The broadband communications system takes advantage of the strength of the CATV network 12 for its broadband communications path and the strength of the telephony network 10 for its connection and switching capability.

The CATV network 12 is illustrated as having a fiber to the serving area (FTSA) architecture. A headend 14 provides CATV programming which is distributed via a distribution network to a plurality of subscribers at their subscriber premises 30. The distribution network serves a plurality of "serving areas", such as the one referenced at 20, which are groups of subscribers that are located proximate to one another. Each serving area is comprised of groups ranging in size from about 125 homes to about 2500 homes. The headend 14 is coupled to each serving area in a star configuration through an optical fiber 18 which ends in a fiber node 16. The CATV programming and telephony signals are converted from an RF broadband signal to light modulation at the headend 14, transmitted over the optical fiber 18, and then converted back to an RF broadband signal at the fiber node 16. Radiating from each of the fiber nodes 16 throughout its serving area 20 is a coaxial sub-network of feeders 22 having bidirectional amplifiers 24 and bidirectional line extenders 25 for boosting the signal.

The RF broadband signal is distributed to each of the subscriber premises 30 by tapping a portion of the signal from the nearest feeder 22 with a tap 26, which is then connected to the subscriber premises through a standard coaxial cable drop 28. The CATV network thus provides a broadband communications path from the headend 14 to each of the subscriber premises 30, which can number in the several hundreds of thousands.

While one embodiment of the broadband communications system shows the input interface 32 coupled to the fiber node 16 and the output interface 34 coupled to the headend 14, it is evident that the insertion and extraction of the RF telephony signals need not be limited to this single architecture. Both the input interface 32 and an output interface 38 (shown in phantom) can be connected at the fiber node 16. Alternatively, both an input interface 36 (shown in phantom) and the output interface 34 can be coupled to the headend 14. For cable architectures that do not conform to a star configuration, it is generally most advantageous to insert the RF telephony signals at the headend and to extract them from the system at the headend. For the preferred embodiment, both the transmitting and receiving telephony interfaces reside at either the headend or the fiber node.

The input and output interfaces 32 and 34 produce a facile method for inserting the telephony signals in one direction and extracting the telephony signals in the other. The telephony signals are transformed into compatible RF signals which can be inserted or extracted from the CATV network 12 in much the same manner as other programming at various points in the network. The compatibility of RF telephony signals with the previous RF signals on the CATV network 12 allows their transmission in a transparent manner over the network without interference to the other signals.

Theoretically, the broadband communications path provided by the CATV network 12 is bidirectional so that information can be passed in each direction. However, because of convention and the single point to multipoint nature of most networks, the reverse path, i.e., communications originating from the subscriber premises 30 and communicated to the headend 14, is much more limited. Normally, the reverse amplifiers 25 are connected to diplexers which separate the CATV spectrum into forward and reverse paths based on frequency.

Figure 2:
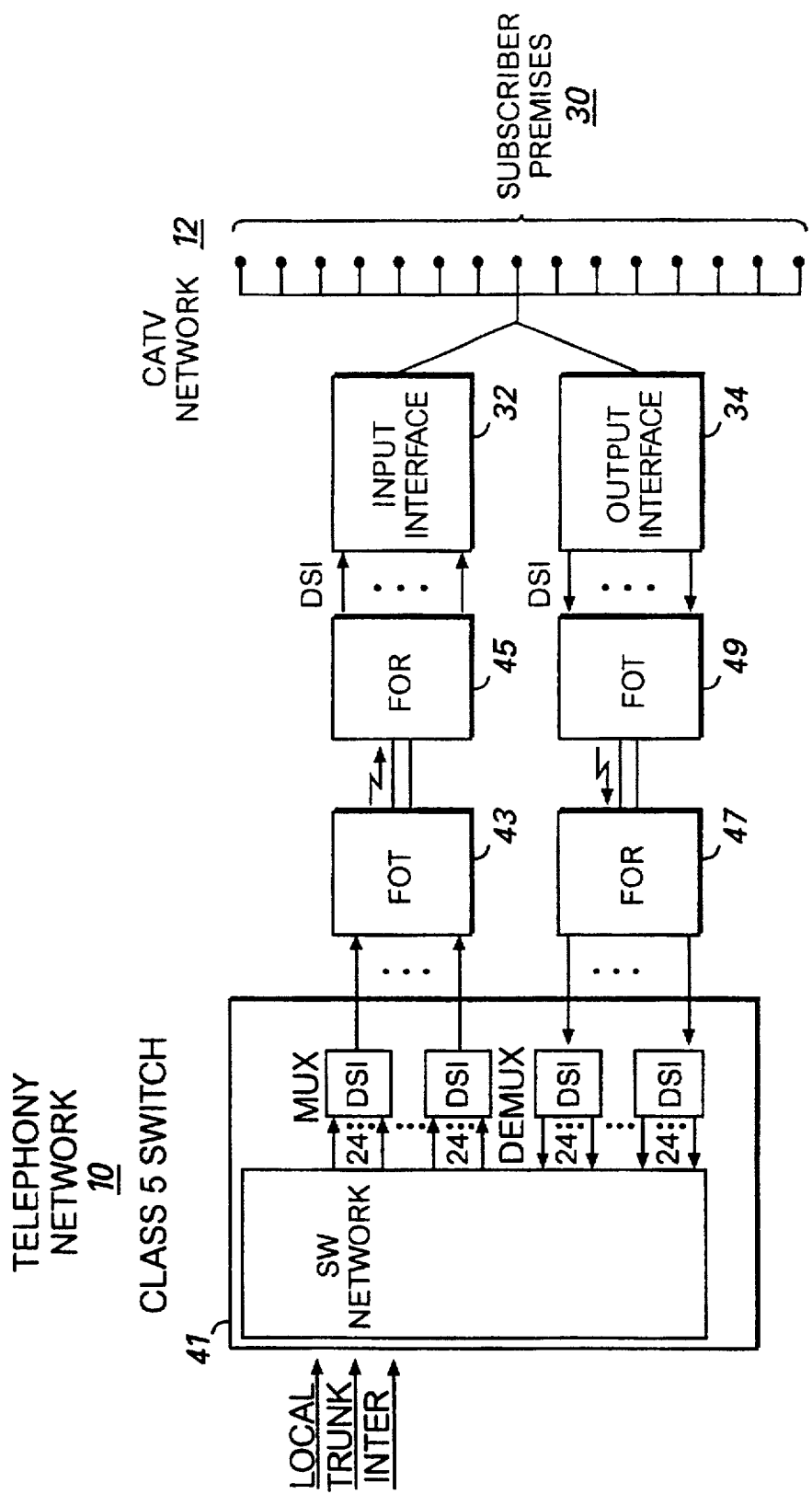
FIG. 2 is a system block diagram of an embodiment of the broadband communications system illustrated in FIG. 1 connected to a telephony network.

FIG. 2 illustrates an implementation of the broadband communication system configured as an extension to a telephony network. For connection to the telephony network 10, a class 5 switch 41 is used. The switch 41 has suitable circuitry for handling conventional local, trunk and interconnect signals which integrate the switch into the local area, national and international calling grids. The switch 41 has a switching network of crosspoints which may switch any of a plurality of inputs to any plurality of outputs. Particularly, the switch 41 has equipment to provide DS1 format interfaces.

As known to those skilled in the art, a "DS0" signal is a standard telephony format corresponding to a 64 kb/s digital channel which can be used for voice, data, audio, etc. Thus a single DS0 telephony signal can be viewed as a single telephone conversation. Likewise, a "DS1" signal corresponds to a 1.544 Mb/s digital channel that contains 24 DS0 channels. For a summary of the bit rates of the standard digital telephony formats and their relationships to one another, see TABLE 1 below:

TABLE 1

| Digital Signal | Bit Rate | DS0 | DS1 | DS3 |
| --- | --- | --- | --- | --- |
| DS0 | 64 kb/s | 1 | 1/24 | 1/672 |
| DS1 (also T-1) | 1.544 Mb/s | 24 | 1 | 1/28 |
| DS1C | 3.152 Mb/s | 48 | 2 | 1/14 |
| DS2 | 6.312 Mb/s | 96 | 4 | 1/7 |
| DS3 | 44.736 Mb/s | 672 | 28 | 1 |
| OC-1 | 51.84 Mb/s | 672 | 28 | 1 |

Additionally, the switch 41 has means for demultiplexing DS1 signals into a plurality of DS0 signals which then can be routed to outgoing points. The system uses a forward path which receives a plurality of the DS1 channels at the input interface 32 and connects them over the CATV network 12 to the subscriber premises 30. The subscriber premises 30 transmits telephony signals over the CATV network 12 to the output interface 34 which converts them back into the same number of DS1 signal channels for transmission to the switch 41. If the switch 41 is located proximately to the input interface 32 and the output interface 34, then they can be coupled directly. Alternatively, as will be the most prevalent case, where a headend or fiber node is not located proximately to the class 5 switch, an optical fiber link can be used to connect the switch 41 and interfaces 32 and 34.

In the forward direction, a fiber optic transmitter 43 converts the plurality of DS1 telephony signals into an optical signal which is transmitted to a fiber optic receiver 45. The fiber converts the optic receiver 45 converts the optical signal back into the DS1 format telephony signals. Likewise, the fiber optic transmitter 49 in the reverse path converts the outgoing DS1 telephony signals into an optical signal which is received by the fiber optic receiver 47, for conversion back into the DS1 telephony format signals.

The DS1 telephony signal format was chosen because it is a standard telephony format, and conventional optical links to do the conversion and transmission are readily available for the transmitters 43, 49 and for the optical receivers 45, 47.

The system uses this bidirectional mode of communication where each DS1 signal can contain up to 24 DS0 channels, which can be considered groups of 64 kb/s digital data channels. The 64 kb/s channels can either be used for voice, data, audio (music, stored information), etc. For the 1:1 configuration, for telephony type signals, each DS0 channel derived from a connected DS1 link is addressed to and associated with a particular subscriber. This disclosed embodiment provides transport from each DS0 signal in the connected DS1 link to the particular subscriber, by transmitting incoming telephony signals downstream in a selected DS0 downstream channel in the broadband system forward path, and has a corresponding DS0 upstream channel assigned to that subscriber in the broadband system reverse path for outgoing telephony signals. Received DS0 signals from subscribers are then routed to the corresponding DS0 time slot in the DS1 link for outgoing signals. This permits the switch 41 to connect any of the local, trunk or interconnect calling points to any of the DS0 channels in the forward path and its associated DS0 channel in the reverse path to the same local, trunk or interconnect points for completing the communications path. Each of the subscribers 30 appears as another DS0 subscriber connected directly to the class 5 switch 41. The distribution system of the CATV network 12 is transparent to the switch 41 and does not need any further communication, information or connection to the broadband communication system.

Figure 3A:
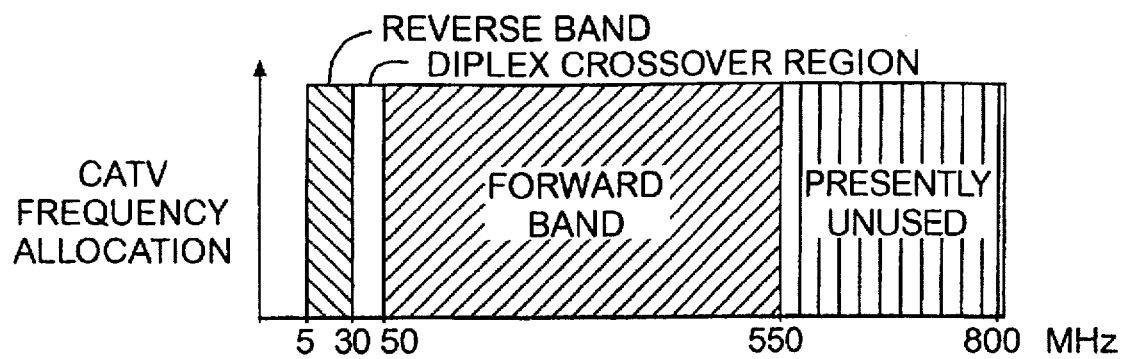
FIG. 3A is a pictorial representation of the frequency allocation of typical split CATV systems illustrating their forward and reverse signaling bands.

FIG. 3A illustrates a typical frequency allocation for many of the installed split band CATV networks within the United States. The frequencies used for programming which generate the revenues for the system operator are carried in the forward band from 50 MHz to about 550 MHz. Although, the frequencies above 550 MHz are not presently used, there has been increased interest in providing additional services in this unused forward bandwidth, currently considered to extend to about 1 GHz. Conventionally, the forward band comprises a series of video channels, each 6 MHz in bandwidth, which are frequency division multiplexed across the forward band.

In combination with the forward band, the typical CATV spectrum includes a reverse band from about 5–30 MHz. These frequencies have been allocated for signals returning from the subscriber to the headend. The broadband communications system provides a system where the telephony signals to a subscriber premises are communicated in the forward band of the spectrum and the telephony signals from a subscriber premises are communicated in the reverse band of the CATV system.

Figure 3B:
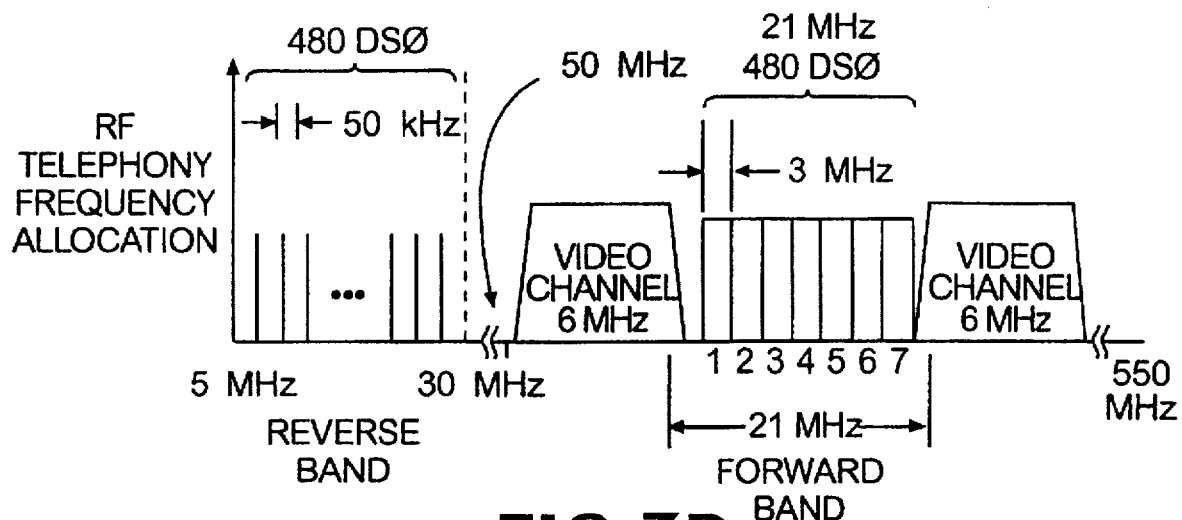
FIG. 3B is a pictorial representation of the frequency allocation of the broadband communications system illustrated in FIG. 2.

As seen in FIG. 3B, the broadband communications system utilizes a plurality of frequency division multiplexed carriers in the forward band to communicate the telephony signals to the subscribers. In the illustrated embodiment, seven (7) channels of approximately 3 MHz are used to carry incoming telephony signals from the telephony network 10. Each forward channel is a QPR modulated carrier, where the modulation occurs as a digital data stream including DS0 telephony signals.

Each of the reverse band signals are about 50 kHz in bandwidth (preferably 49.5 kHz), which is narrow enough to be easily placed at different frequency division multiplexed positions in the frequency spectrum. The modulators are frequency agile and can reallocate frequencies based upon traffic over the system, noise, channel condition, and time of use. The 49.5 kHz wide carriers can be placed anywhere in the reverse band that there is space for them. Further, such system is expandable by bandwidth for other uses besides the individual telephony signals. For example, if a particular subscriber required a return path of a greater bandwidth than 49.5 kHz, then the bandwidth could be easily allocated to this use without a complete reconfiguration of the system. Such uses may include high speed data transmissions, trunk connections for small central offices, video services originating from the telephony network, and other uses requiring a nonstandard bandwidth.

In view of the foregoing, it will be appreciated that the broadband communications system uses the reverse band efficiently and uses only that portion of the forward band which is necessary. Digital QPR and QPSK modulation is used to permit digital and telephony services to the subscriber and provide a robust signaling method allowing the forward or reverse signals to be placed anywhere in the CATV band.

Figure 3C:
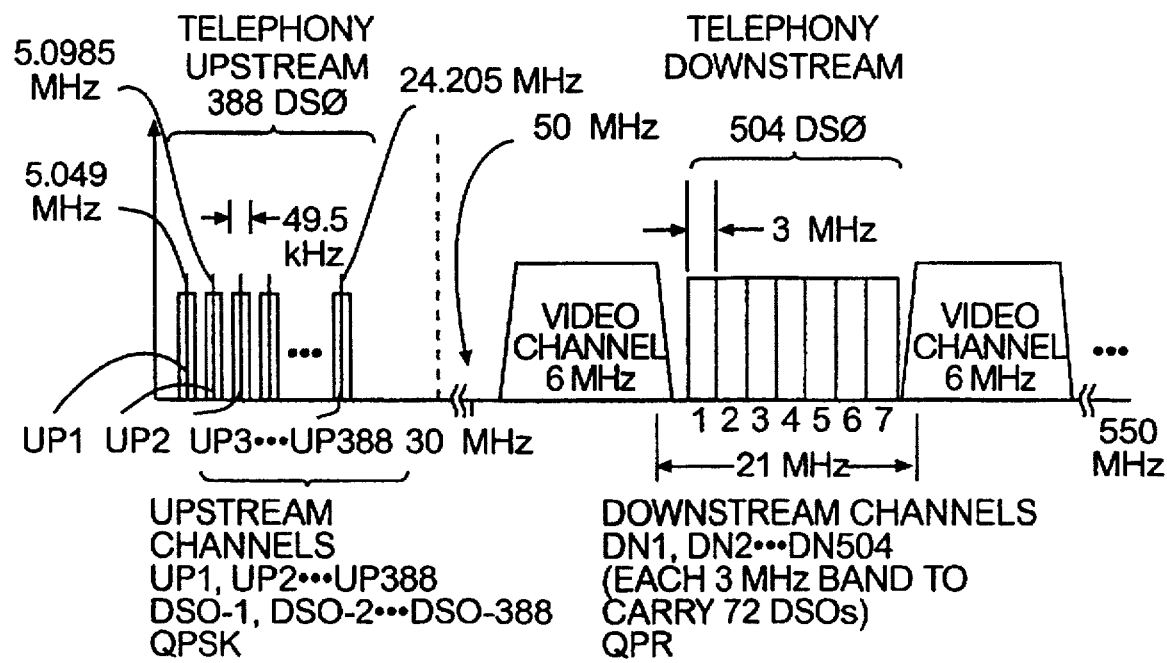
FIG. 3C is a pictorial representation of the frequency allocation of an alternative embodiment of the broadband communications system.

FIG. 3C illustrates an alternative frequency allocation for a split band CATV network that is implemented in another embodiment of the broadband communications system. As in the prior embodiment, the frequencies used for television programming that generate the revenues for the system operator are generated in the forward band from about 50 MHz and above. The spectrum in FIG. 3C includes the reverse band from about 5 MHz to about 30 MHz. The 5–30 MHz band is used for upstream telephony signals in the form of 388 DS0's, QPSK modulated in 49.5 kHz upstream channels or subbands designated UP1, UP2, . . . UP388, where each upstream channel UPn carries 1 DS0. Thus, in order to accommodate 388 DS0's, 388 QPSK carriers or channels are required. Each of the upstream channels UPn consumes 49.5 kHz bandwidth. Although FIG. 3C presents a spacing between each pair of upstream carriers, it will be understood that the upstream carriers are 49.5 kHz wide on 49.5 kHz spaced centers. In other words, there is no requirement for a guard band between upstream carriers for this embodiment of the broadband communications system.

It will be understood that the representative set of upstream carriers shown in FIG. 3C can extend to the approximate edge of the upstream band. The providers of the communications services offered by the embodiment of the broadband communications system can determine whether to use all or a portion of the upstream band for allocation of upstream carriers. The upstream band can include up to 504 upstream carriers.

The downstream telephony is provided in downstream channels DN1, DN2 . . . DN504, each DN corresponding to a DS0. In one embodiment, a total of 21 MHz of bandwidth is provided in 3.0 MHz subbands, wherein seven 3.0 MHz subbands carry the equivalent of 72 DS0 telephony signals, in QPR modulation. The downstream band can include up to 504 DS0 telephony signals.

Although FIGS. 3A, 3B, and 3C illustrate reverse bands, also called upstream bands, extending between 5 and 30 MHz, those skilled in the art will appreciate that this allocated frequency spectrum can extend up to 65 MHz for geographical areas outside of the United States, such as Europe. In addition, it will be understood that the downstream channels can also be placed in the frequency range above 550 MHz to avoid conflict with television signals typically carried in the 5–550 MHz segment. Thus, the alternative frequency allocations shown in FIGS. 3B and 3C are not limited to the placement of downstream channels within the 50–550 MHz spectrum, but can be extended to include the placement of these downstream signals in the frequency range above 550 MHz.

Figure 4:
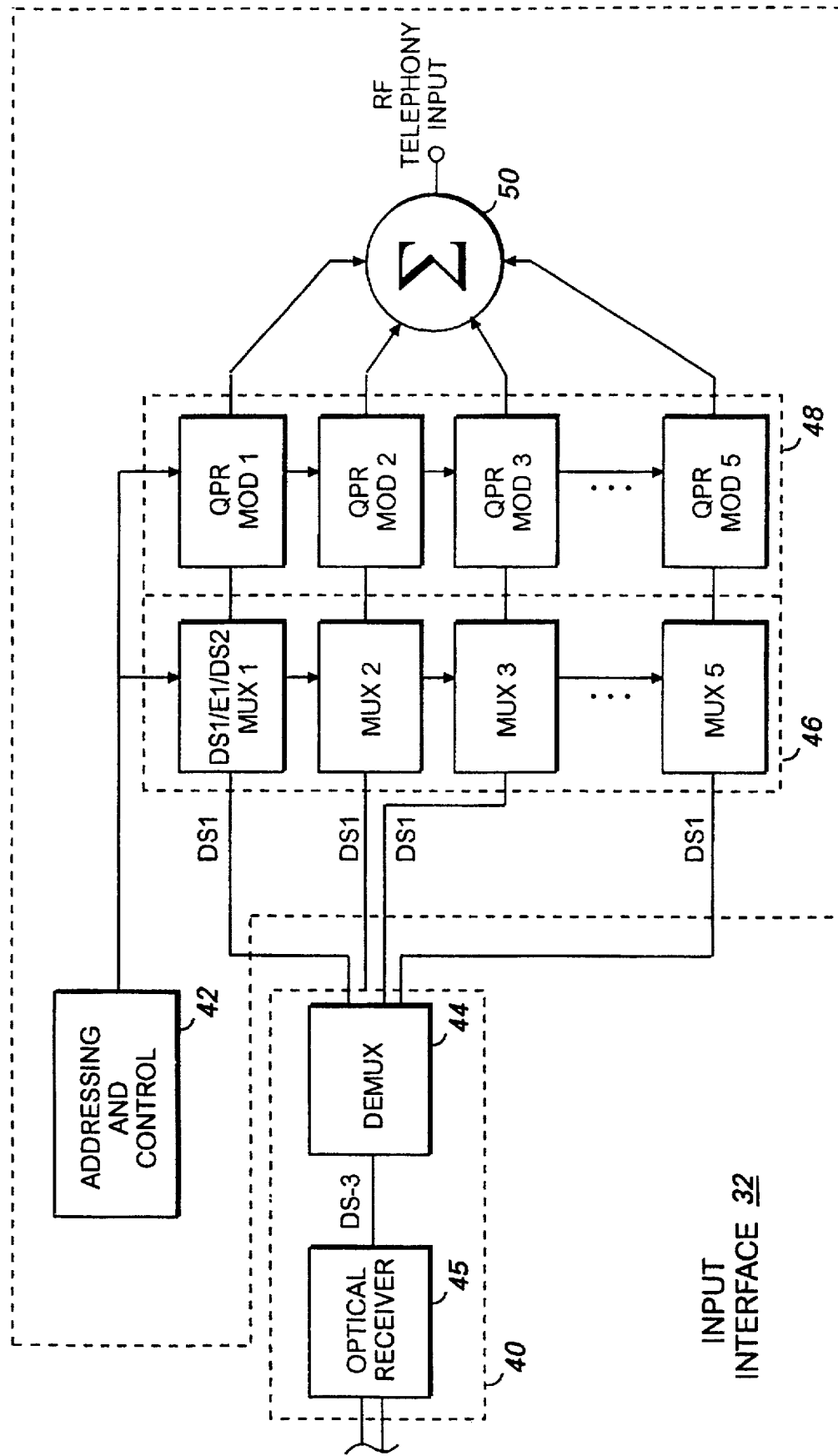
FIG. 4 is a detailed block diagram of the telephony network to the CATV network input interface of the system illustrated in FIG. 2.

A detailed block diagram of the input interface 32 is illustrated in FIG. 4. The function of the input interface 32 is to convert telephony signals into QPR modulated RF signals which are sent to the subscribers in the forward band of the CATV system 12. The input interface 32 can be connected to an optical interface 40, comprising a fiber optic receiver 45 and a demultiplexer 44. The fiber optic receiver 45 operates to convert the optical signal into an RF digital signal of a standard telephony format. The demultiplexer 44 receives the digital DS3 telephony signal and separates it into component DS1 signals.

The input interface 32 comprises multiplexers 46, which accept DS1 signals from the demultiplexer 44 and combine them with signaling and addressing bits from the addressing and control unit 42 to form a serial digital signal. Each of the digital signals is modulated on a selected carrier frequency by an associated QPR modulator 48. The telephony channels from the outputs of the modulators 48 are frequency division multiplexed together in an RF combiner 50 before being inserted conventionally on the CATV network 12.

Figure 5:
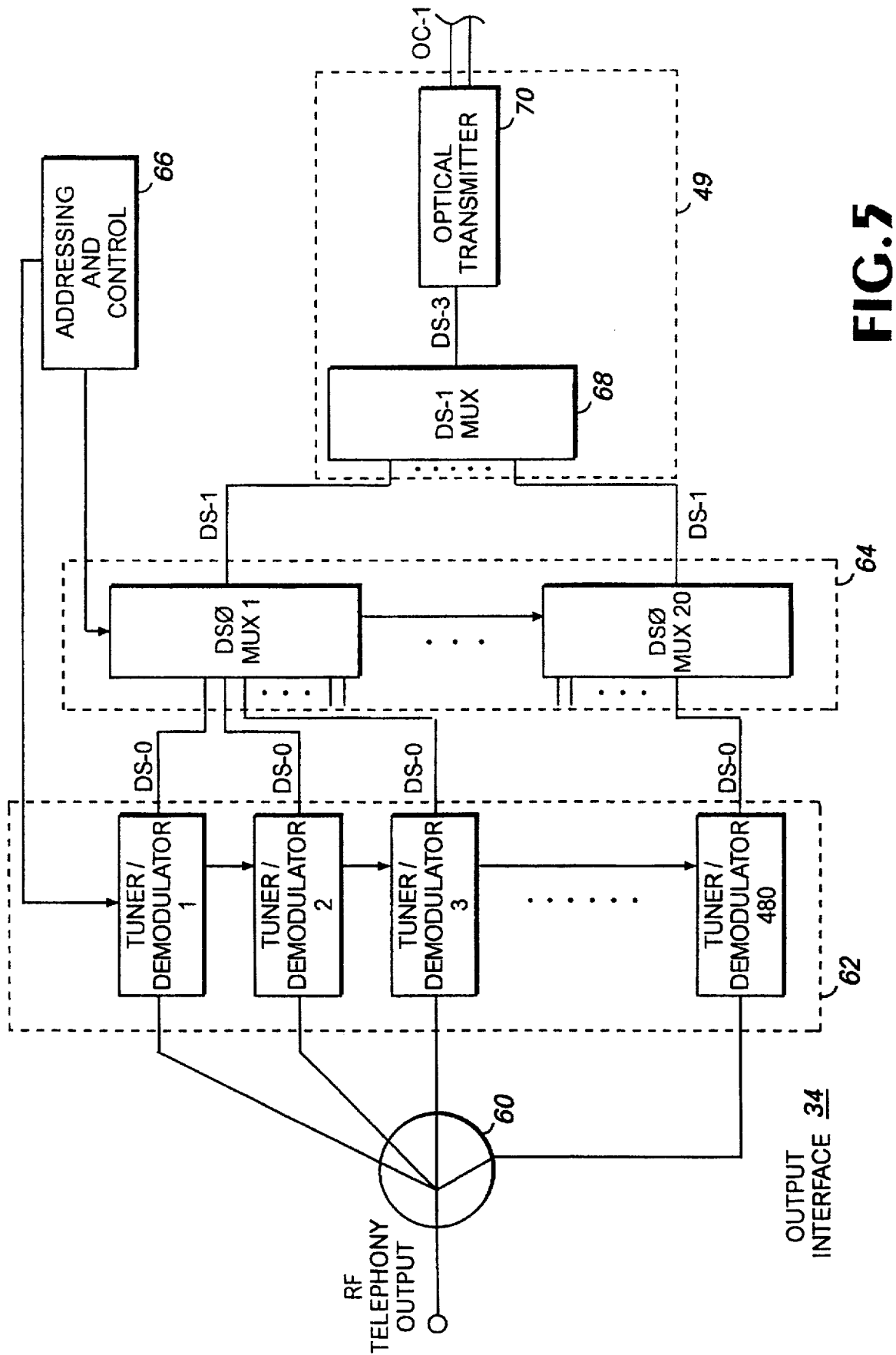
FIG. 5 is a detailed block diagram of the telephony network to the CATV network output interface of the system illustrated in FIG. 2.

The output interface 34 will now be more fully described with reference to FIG. 5. The output interface 34 functions to convert DS0 digital signals which are QPSK modulated on the reverse band carriers into the optical format for coupling to the telephony network 10. The output interface 34 extracts the reverse band signals in a conventional manner and fans them out with a signal divider 60 to a plurality of tuner/demodulators 62. Each of the tuner/demodulators 62 is adapted to tune channels in discrete frequency segments. Internal processing tunes to one of the carrier frequencies of the reverse band signals and demodulate it into a DS0 format digital signal. The tuners of the tuner/demodulators 62 can be variable or fixed, or can be adapted to tune only certain bands of the reverse spectrum. The output of the tuner/demodulators 62 is a set of DS0 signals which are concentrated into groups of DS1 signals by a group of multiplexers 64 under the control of addressing and control unit 66.

Each of the multiplexers 64 inputs DS0 formatted signals and can output a DS1 formatted signal to a fiber optic transmitter 49. At the fiber optic transmitter 49, the DS1 signals can be concentrated by a multiplexer 68 into a single digital telephony signal, such as a DS3 signal, which is input to the optical transmitter 70. The optical transmitter 70 converts the RF signal into light so the optical fiber of the telephony network can transmit it.

Figure 6:
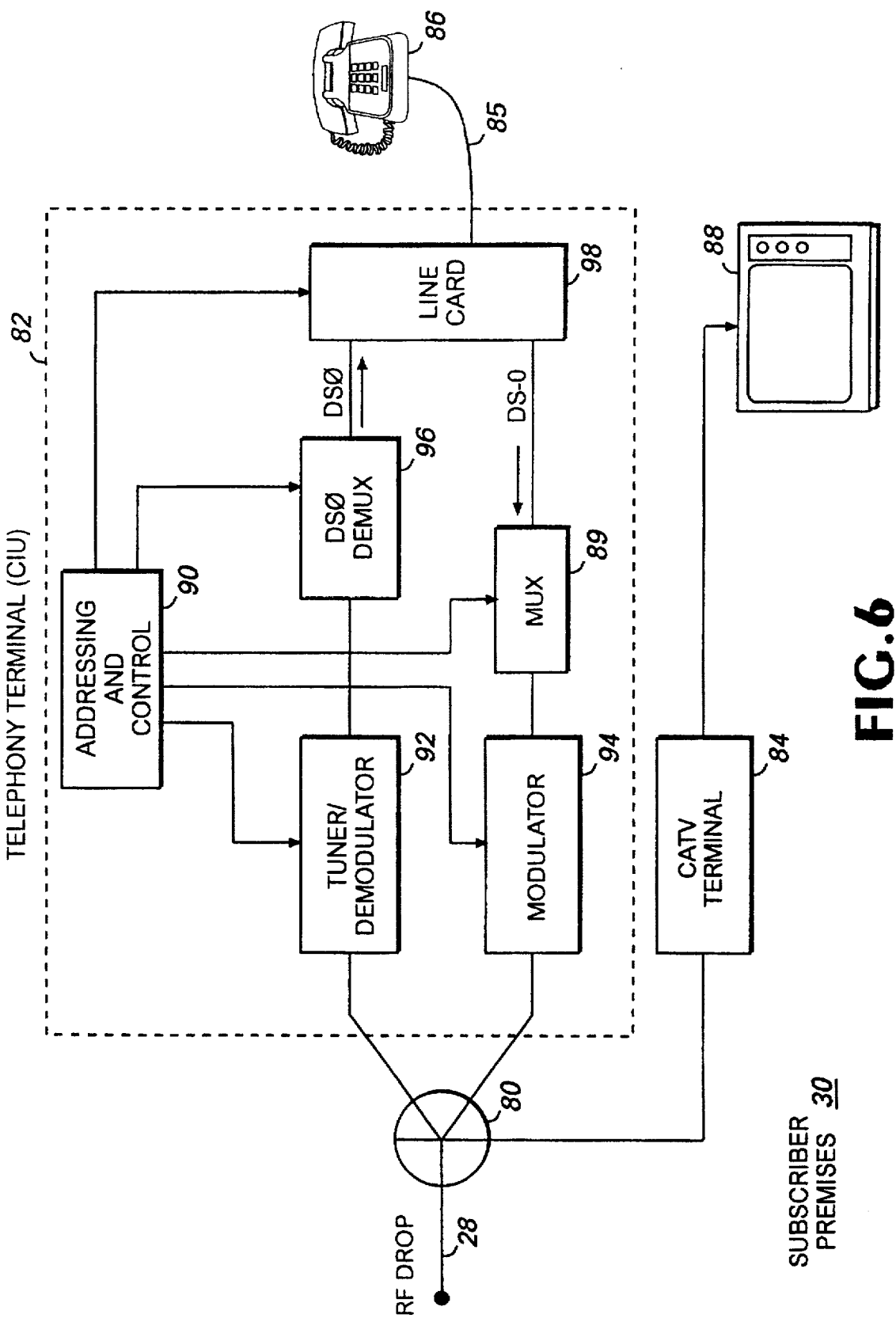
FIG. 6 is a detailed block diagram of a telephony terminal for receiving telephony signals from the telephony network through the CATV network and for transmitting telephony signals to the telephony network through the CATV network.

A detailed block diagram of the system equipment at the subscriber premises 30 is shown in FIG. 6. Referring now to FIGS. 3C and 6, the subscriber generally will want to maintain CATV video or other services and has a CATV terminal 84 for this purpose connected between the CATV drop line 28 and a television receiver 88. The CATV terminal is connected to a splitter/combiner/diplexer 80 coupled to the drop 28 from one of the CATV coaxial subnetwork feeders.

Because the presently described broadband communications system does not interfere with or displace the conventional CATV programming and frequency allocations, the CATV terminal 84 can generally be used with no modification or change in operation of the installed terminal base. The system operator does not need to change or reconfigure its distribution network operation and the new telephone service is compatible with its installed CATV subscriber terminal base.

The broadband communications service is provided by coupling a telephony terminal, also called a "customer interface unit" 82, between the splitter/combiner/diplexer 80 and the telephone equipment 86. The customer interface unit 82 converts the incoming telephony signals to a subscriber into analog signals which can be used by a standard telephone handset 86 over a pair of twisted wires 85. Further, the customer interface unit 82 converts the analog signals, representing outgoing telephony signals from the handset 86, into a QPSK modulation which is coupled to the CATV network. A standard telephone handset 86 is shown for the purpose of illustration but could in fact be any equipment normally connected to a telephone line for analog communications purposes.

The telephony terminal 82 has two communication paths. The first path for incoming signals comprising a tuner/demodulator 92, a demultiplexer 96, and a line card 98 and a second path for outgoing signals including the line card 98, a multiplexor 89, and a modulator 94. The multiplexor 89, tuner/demodulator 92, modulator 94, demultiplexer 96, and line card 98 are under the control of an addressing and control unit (CPU) 90.

For incoming telephony signals which are received in the 3 MHz channels modulated on an FDM carrier, the control unit 90 causes the tuner/demodulator 92 to tune the carrier on which the particular call information directed to the subscriber is carried. The carrier defines one of up to seven 3 MHz channels having 72 DS0 telephony signals QPR modulated thereon.

The telephony signals are demodulated by the tuner/demodulator 92 into a serial digital stream containing the 72 DS0 telephony signals before being input to the demultiplexer 96. The demultiplexer 96 selects the particular DS0 digital telephony channel assigned to the subscriber at the input rate of 64 kb/s and inputs the data to an input terminal of the line card 98.

The DS0 digital format provides a voice channel with sufficient bandwidth for voice quality communications. The DS0 format is a 64 kb/s data stream of bytes forming timed samples of an analog voice signal. This produces a voice signal quantized to 8-bits per sample (256 values) at a sampling rate of 8 kHz and with a bandwidth of approximately 4 kHz.

The line card 98 receives the digital telephony signal in the DS0 format and converts it to the proper analog voltages and signals to drive the telephone handset 86. In addition, the line card 98 provides ringing current, terminal identification, and other standard functions under the direction of control unit 90. The line card 98 receives the analog telephony signals from the telephone handset 86 and converts them into a digital DS0 format. Dialing signals and other addressing and control signals from the handset 86 are also digitized by the line card 98. The digitized outgoing telephone signals are then combined and formatted by the line card 98 into a DS0 format at 64 kb/s and input to the modulator 94 via a multiplexor 89.

The modulator 94 under the regulation of the control unit 90 selects a carrier frequency in the reverse band and QPSK modulates the DS0 telephone signal thereon. The QPSK modulated carrier having a bandwidth of 49.5 kHz is coupled on the CATV network through the splitter/combiner/diplexer 80.

Figure 7:
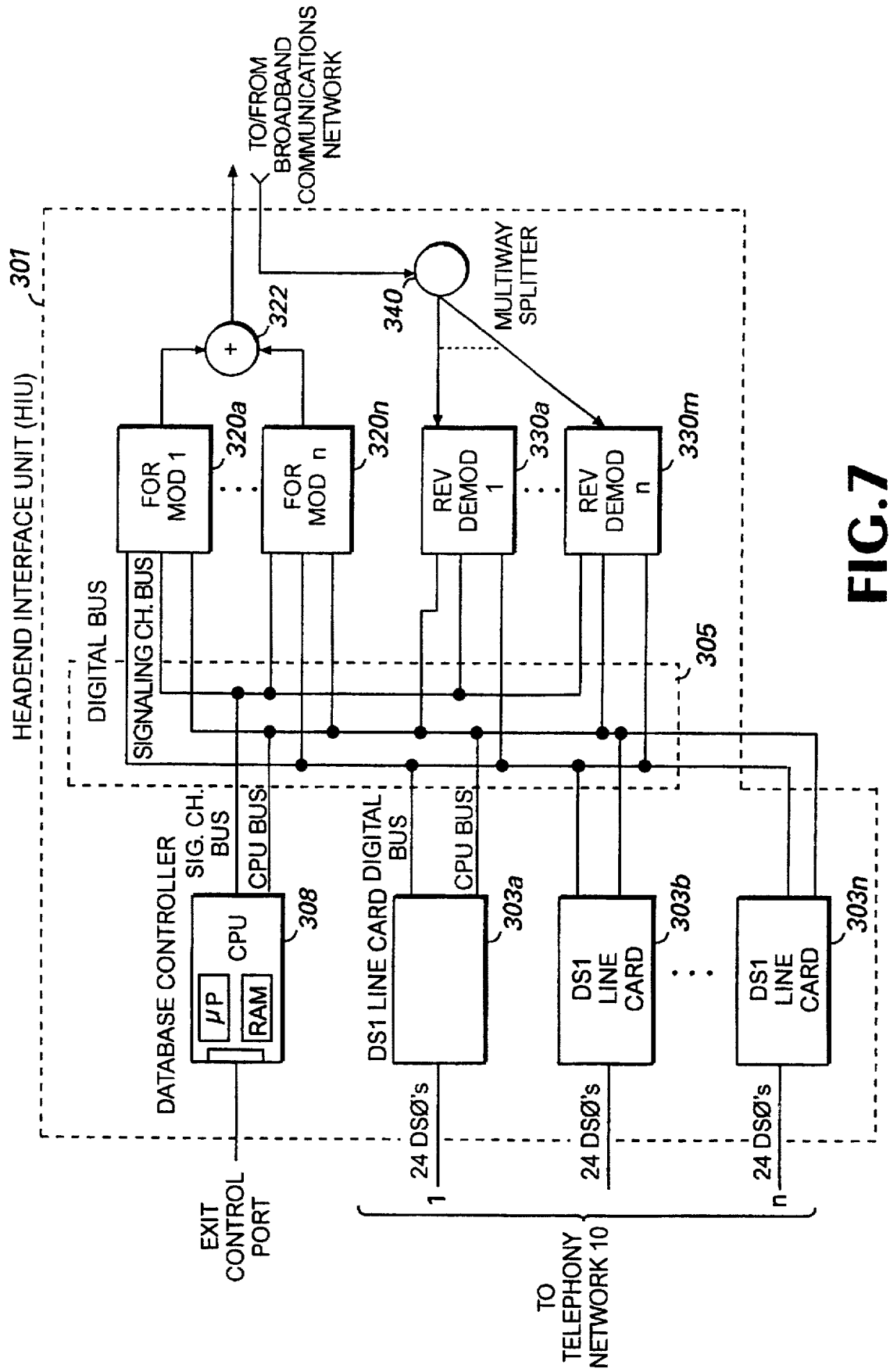
FIG. 7 is a block diagram of a headend interface unit (HIU) constructed in accordance with an embodiment of the broadband communications system.

Turning next to FIGS. 3C and 7, a headend interface unit (HIU) 301 constructed in accordance with an embodiment of the broadband communications system will be described. The HIU 301 is suitable for use either as equipment comprising the headend 14 or equipment comprising the fiber node 16 shown in FIG. 1, both of which are operative for receiving multiplexed digital telephony signals in a standard telephony format, such as DS1 or E1 formats, and coupling such signals to an input interface 32, 36 or an output interface 34, 38. Although the preferred embodiment is described in connection with a coaxial line HIU, it will be understood that the principles are applicable for an optical-fiber based HIU that employs methods for communicating broadband signals via amplitude modulation (AM) methods, such as described in U.S. Pat. No. 5,262,883, which is owned by the assignee of the present invention. Briefly described, the HIU 301 is operative for connecting to a telephone company (telco) standard multiplexed telephony signal, directing incoming telephony signals to subscribers downstream on the broadband network using QPR modulation in the forward path, and receiving outgoing telephony signals from subscribers upstream on the broadband network in one or more selected subbands within the reverse path spectrum, commensurate with service levels or features elected by subscribers.

The HIU 301 shown in FIG. 7 involves the use of digital line cards 303 that provide digital signals to a digital bus 305, operating together with a central processing unit (CPU) 308 corresponding to the address and control unit 42 as shown in FIG. 4.

The HIU 301 comprises a plurality of DS1 line cards 303a . . . 303n, for connection to the telephony network 10 or to a higher level multiplexer/demultiplexer capable of handling higher level multiplexing such as DS2 or DS3. Each DS1 line card 303 can provide interfaces compatible with ANSI Doc. T1.403 (1989 version), which is incorporated herein by reference and made a part hereof. Each line card 303 provides a digital output signal that is coupled to the digital bus 305. The bus operates to connect the line cards 303 and route signals between the line cards and the forward and reverse path modulators, to be described. The digital bus 305 is preferably implemented as a series of point-to-point links rather than as a shared bus.

A CPU 308 is operative to control the assigned relationships between particular telephony lines, ingoing and outgoing, with predetermined carrier assignments in the reverse path and in the forward path, monitor the noise level in the reverse path, and assign DS0 channels in the reverse path commensurate with subscriber features and the like. CPU messages are handled via timeslot assignments in the serial busses of the backplane 305.

The preferred CPU 308 is a Motorola 68360 32-bit microprocessor with built-in memory (DRAM) controller and is operatively connected to random access memory (RAM). Details of the preferred CPU are available in the literature supplied by the manufacturer.

Still referring to FIG. 7, the bus 305 provides a communications path between the CPU 308 and each of a plurality of forward channel modulators 320 and reverse channel demodulators 330. The bus 305 can communicate status information associated with a telephony line such as off hook, on hook, busy, ring, security status, and the like. Bits associated with particular status states of the subscriber's telephone and of the associated telco line are included and combined with digitized telephony signals and transmitted to the CIU's 400, as described below.

In the disclosed embodiment, the HIU 301 comprises a plurality of forward channel modulators 320a . . . 320n and a plurality of reverse channel demodulators 330a . . . 330m. The forward modulators 320 couple outgoing telephony signals to the broadband network in the forward spectrum, while the reverse channel demodulators receive telephony signals from CIU's in the reverse spectrum via the broadband network. Each of the forward channel modulators 320 is connected to a combiner 322 that is operative to combine the RF signals from the forward channel modulator and provide an output to the broadband communications network. A multiway splitter 340 is copied to the broadband communications network.

It will be appreciated that the broadband communication network (not shown) connected to the multi-way splitter can either be a coaxial cable network, or alternatively can be an additional fiber optic link that is amplitude modulated to carry the broadband signal in a manner known to those skilled in the art. For the coaxial cable network implementation, a diplexor can be connected to the broadband communications network for routing signals to the multiway splitter 340 and from the combiner 322. In contrast, for an optical fiber implementation, a diplex filter would not be required because laser transmitters and receivers are unidirectional devices. For the optical fiber implementation, the output of the combiner 322 would drive a laser transmitter and the output of a fiber receiver would feed the multiway splitter 340.

Still referring to FIG. 7, the HIU 301 further comprises a plurality of reverse channel demodulators 330a . . . 330m that are connected to receive signals from the multiway splitter 340. A separate reverse channel demodulator is provided for each possible frequency allocated in the reverse spectrum for upstream telephony signals.

FIG. 8 illustrates a frequency agile customer interface unit or CIU 400 constructed in accordance with the alternative embodiment of the broadband communications system. Referring to FIGS. 3C and 8, the CIU 400 is utilized in the same manner as described in connection above with the telephony terminal 82, and includes the same basic components as described in connection with FIG. 6. However, there are certain differences, as will be described.

The CIU 400 is especially adapted for utilization with selectable bandwidth features or services that may be subscribed to by a subscriber, e.g., single line telephony service, multiple line telephony service, ISDN service, data communications service, local or wide area network of data communications such as ETHERNET, or the like.

In order to implement the on-demand selectable services and to accommodate the varying bandwidths for such services, the CIU 400 includes one or more line cards 98', which are constructed basically the same as the line card 98 shown in FIG. 6. The alternative line cards 98' are of varying types depending upon the nature of the service that is to be connected. For example, the line card in 98'a is adapted for two conventional voice grade telephony line 402a, 402b that comprise the conventional 2-wire twisted pair copper connections with tip (T) and ring (R) known to those skilled in the art. On the other hand, the line card 98'b is adapted for ISDN and includes a standard ISDN connector. Other types of lines cards 98'n may be provided for connection of other types of customer data service such as local area network data communications (e.g. ETHERNET), security monitoring systems, video teleconferencing, etc.

Thus, it will be understood that the line cards 98' include connectors suitable for the particular type of data service to be provided on behalf of the customer. For example, a line card configured for connection to a security alarm network will include a compatible physical connector for connection to the customer's alarm system network and will include circuitry for converting data from the alarm system network into the 64 kbps digital data stream provided for upstream communications.

The standard telephony line card 98'a includes a pair of subscriber line interface circuits (SLIC) 405 that are adapted to receive signals on voice grade telephony lines 402 and couple them to a coder/decoder (CODEC) 407 for digitization. The voice grade telephone lines 402 may be coupled to a subscriber's home wiring network so that a number of subscriber telephones connected in parallel may access a given telephone line. The CODECs 407 are operative to digitize the voice grade telephone lines into serial 64 kbps digital data. The output of the codec 407 comprises a digital serial data that is output in response to commands from a control CPU 410 that serves in a capacity corresponding to the address and control unit 90 in the embodiment shown in FIG. 6.

An ISDN-capable line card such as 98'b is substantially the same as the line card 98'a, except that the SLIC circuitry is operative to provide an appropriate ISDN connection, but still provides two 64 kbps digital data streams as outputs. The principal requirement of the line cards 98' are to provide a suitable physical connection for customer data in the form of standard output ports or connectors, and provide digital data streams as outputs in response to commands from the CPU 410. Further, plural line cards may be provided at any given customer premises, depending upon the particular types of services to be provided to the customer.

It will be understood that the nature of the service that is provided at any given CIU 400 must be preidentified and prestored in memory in the HIU 301 that is utilized as the telephony network interface, so as to enable provision of the selected service upon demand. In response to a request for service either originating with a subscriber at a selected CIU, or a request for incoming service to a subscriber originating externally to the network, status signals such as the subscriber going off hook, or a ringing condition on an incoming line, the system causes the selection and allocation of appropriate bandwidth, DS0 channels, reverse channels, carriers, etc., required to provide the selectably variable bandwidth commensurate with the selected service.

Still referring to FIG. 8, the line cards 98', whether one or many, are preferably connected to a backplane 412 in the CIU so that signals from the various line cards may be coupled to appropriate modulators and demodulators and receive control signals from the CPU 410. The preferred backplane 412 includes a 4.096 Mbps serial digital bus that is operative to transmit 64 kbps data in a TDMA manner from a selected CODEC 407 in a selected line card to a selected reverse channel modulator 415. There is also provided a second 4.096 Mbps digital bus for transmitting data from a forward channel demodulator 420 to selected CODEC 407 in a selected line card for outgoing transmissions. The CPU 410 is operative to control the selection of line cards, reverse channel modulators, and the forward channel demodulator. While the disclosed embodiment illustrates the use of two 4.096 Mbps digital busses in parallel, it will be understood and appreciated to those skilled in the art that a single 8.192 Mbps digital bus could also be used.

The backplane 412 in the CIU 400 further includes a signaling bus that couples control signals between the line cards 98' and the CPU 410. The signaling bus carries status signal associated with status of the telephony lines such as off hook, on hook, alarm, busy, ring, for inclusion as a part of the status information associate with the selected service.

Outgoing data from the line cards 98' are provided to reverse channel modulators 415 for provision to the broadband network. Each line card generally provides a DS0 (64 kbps) data stream, which is transmitted in the reverse path on a carrier by a single reverse channel modulator 415.

Incoming data from the broadband network is derived from at least one forward channel demodulator 420, which is operative to monitor a preassigned channel in the QPR-modulated forward channel utilized for incoming telephony signals. The preferred forward demodulator 420 operates in the manner described above to demodulate a QPR modulated forward channel signal in the designated telephony downstream subband and to monitor the directory channel and signaling channels provided as a part of the overhead data.

It will be noted that a plurality of reverse channel modulators 415a . . . 415n may be required to provide the appropriate bandwidth required for a given level of service. For example, if a selected service entails the equivalent of four DS0's, then there is the need for four reverse channel modulator 415. Furthermore, it will be recalled that each modulator 415 is frequency agile and is not necessarily operating at a given fixed upstream carrier frequency, since upstream channels can be reassigned dynamically and in response to changing conditions such as noise level and reallocation of bandwidth in response to the subscriber's needs.

The plurality of reverse channel modulators 415 are connected to a combiner 425 so that the RF output signal can be coupled to the coaxial cable. The output of the combiner 425 is connected to a diplex filter 430 that passes a signal in the 5–30 MHz range for coupling to a splitter 432 that is connected to the subscriber's coaxial cable drop. The diplex filter 430 is further operative to pass signals in the selected forward band spectrum for downstream signals to the forward channel demodulator 420 so that the directory channel, signaling channel, and downstream telephony DS0's may be demodulated and coupled to the appropriate line cards.

The splitter 432 operates to receive signals from the diplex filter 430 in the 5–30 MHz reverse channel and couple them to the coaxial cable drop, to receive incoming downstream telephony signals in the forward frequency band and couple them to the forward channel demodulator 420, and to pass signals to the subscriber's television equipment.

It will be understood that the CIU 400 can be physically configured as separate customer premises equipment located in or near a subscriber's telephony punch blocks. The preferred housing for the CIU 400 is designed for side-of-the house mounting. Moreover, the CIU, because it includes a computer (CPU 410) and associated circuitry, this device could be used for conventional CATV signal management such as pay-per-view control, descrambling, etc. The embodiment of the CIU can include a control connection provided from the CPU 410 to a switch 435 associated with the signal line between the splitter 432 and the subscriber's television. This allows programming signals to be disconnected from a subscriber in the event of the subscriber's failure to render payment for services.

Finally, each CIU 400 is associated with a unique predetermined serial number for identification purposes in the network. This serial number is preferably maintained internally in a read-only memory. Also, within a particular network configuration, each CIU is assigned a unique address by the HIU. The address of the CIU is provided in the upstream channel to the HIU whenever the CIU requests service. The address information can be utilized by the HIU to identify the subscriber associated with the address information and determine the appropriate and authorized level of service to be provided. For example, when a telephone connected to the CIU goes off hook, the address of the CIU is transmitted in association with the off hook status information in the upstream channel to the HIU, where it is received and examined to determine the appropriate service level, DS0 assignments, frequency assignment, etc.

It will be recalled from the discussion above that each CIU 400 contains predetermined address information that is transmitted to the HIU on the upstream signaling channel whenever service is requested by a subscriber, or when a channel is active. Likewise, the address information is transmitted downstream in the directory channel so that a CIU can tune to the upstream channel commanded by the HIU or provide a ring signal to a telephone connected to the CIU. The CPU 410 (FIG. 8) in the CIU is operative to monitor the forward directory channel for incoming signals addressed to it, and to provide an upstream communication identifying itself and any relevant signaling information on the assigned upstream channel UPn. Preferably, the address information and signaling information from all CIU's are transmitted upstream to the HIU in response to a command from the HIU to tune to a particular upstream channel frequency and transmit signaling information including address and status. This is in effect a "polling" operation wherein a particular address CIU is responsive to a command or poll from the HIU to respond with a communication in a particular upstream channel. However, if the broadband communication line has been cut or a malfunction occurs, the CIU will not be able to transmit its address and status information to the HIU.

Therefore, in the event that the coaxial cable is cut and the CIU 400 fails to communicate its identity and status information in response to a poll by the HIU, an alarm condition will be indicated. The alarm condition can cause the setting of an alarm status indicator associated with the particular subscriber so that remedial action can be indicated. It will be understood that the HIU could include a module for monitoring payload traffic that is routed through the HIU. This embodiment of the HIU could generate appropriate telephony messages to a security monitoring service so as to alert a security guard service as to the alarm condition.

From the foregoing, it will be understood and appreciated that the frequency agile CIU is operative for modulating telephony and other signals from a subscriber in a plurality of frequency subbands in the upstream band of a broadband subscription network so as to provide selectably variable bandwidth in the upstream band commensurate with a selected subscriber communication feature such as single voice line, multiple voice lines, ISDN, security monitoring services, and the like. In the preferred embodiment, the bandwidth is selectably allocated in discrete unit of DS0's, which will be understood can be combined to provide for higher capacity digital data channels in response to varying needs of subscribers.

Furthermore, it will be understood that the frequency agile CIU is operative to reassign signals in a selected subband, such as UP1 . . . UPn, to another subband at another frequency in response to a determination by the HIU that the noise level in a particular selected subband exceeds a predetermined level.

Finally, there is provided one upstream data link for each carrier that is utilized by the CIU 400 to provide a general purpose data transport for alarm conditions, configuration information, etc. Each CIU 400 can be assigned at least one upstream frequency which comprises an 8 kbps overhead data channel combined with the 64 kbps data channel to form 72 kbps for each upstream frequency subband. The 8 kbps overhead data channel preferably contains a data link of either 2.67 kbps or 5.33 kbps that carries the subscriber's address as well as status information associated with a subscriber's address.

One of the difficulties of implementing a commercially viable broadband telephony system is the problem of limited bandwidth, particularly in the reverse direction. One commonly used technique of lessening the effect of limited bandwidth in the reverse path is to configure the cable system in an FTSA architecture. In the FTSA configuration, as previously described, the subscriber base is divided into smaller groups of subscribers, called serving areas, which allows for the reuse of limited reverse band frequency ranges.

In order to facilitate the concentration of the largest number of subscribers onto the network as possible by statistical multiplexing techniques, the broadband communications system can be configured to allow multiple subscribers to share reverse path frequencies, even if the system is arranged in an FTSA configuration. This necessarily means that at any given time there may be contention among multiple subscribers assigned to the same reverse frequency for access to that channel.

To solve this problem, another embodiment of the broadband communications system provides a reverse path allocation and contention resolution scheme that enables multiple CIUs to communicate with a single HIU. Referring to FIG. 9, the preferred reverse path allocation and contention resolution scheme will be shown and described. The reverse path allocation and contention resolution scheme is facilitated by the use of data link 590, over which command/ response transport between the HIU 301 and multiple CIUs 400a–400n occurs. This data link 590 can be viewed as a part of the downstream signal path connecting these devices. It will be appreciated that n could potentially be any number of CIUs serving any number of subscribers in the cable/ telephony system. For example, in an FTSA configuration constructed in accordance with the preferred embodiment, there would be approximately 125-2500 subscribers or CIUs associated with each HIU. The data link 590 generally provides transport of information such as alarm status, performance monitoring statistics, diagnostic status, firmware download, and subscriber loop functions.

The data link 590 is preferably a 128 kilobits per second (kbps) common channel that carries data messages in the forward or downstream direction from the HIU 301 to each of the CIUs 400a–400n. As previously described, each CIU 400 is associated with a predetermined address in the network. Among the data messages carried by the data link 590 in the forward direction are the reverse frequencies that are assigned to particular CIU addresses. Thus, in the illustration shown in FIG. 9, the CIUs 400a–400n are operative to continuously tune to the common forward data link channel in order to determine the reverse frequency on which it has been assigned to communicate back to the HIU 301.

In the reverse or upstream direction, the data link 590 can be implemented as a 2.67 or 5.33 kbps channel unique for each CIU that carries data messages from the CIU 400 back to the HIU 301. Thus, the data link 590 is point-to-multipoint in the forward direction and is point-to-point in the reverse direction.

Signaling on the data link 590 is on a per channel basis and is represented by four overhead bits (ABCD) carried in the framing. For the reverse direction, the 'A' bits are used to carry messages that indicate required telephony signaling such as on hook and off hook. For example, A=0 may define the "on-hook" condition and A=1 may define the "off-hook" condition. The 'D' bits are used for handshaking protocol. Specifically, the 'D' bit is set high to indicate that the CIU 400 is currently sending addressing information across the data link 590 rather than PCM voice data. The remaining two bits in the framing are presently undefined and reserved for future use.

For the forward direction, the 'B' bits carry messages that indicate required telephony signaling such as the ringing cadence. For example, B=0 may define the ring active state and B=1 may define the ring inactive state. Again, the 'D' bit is used for handshaking protocol, as in the reverse direction. The two remaining bits are presently undefined and reserved for future use.

Figure 10A:
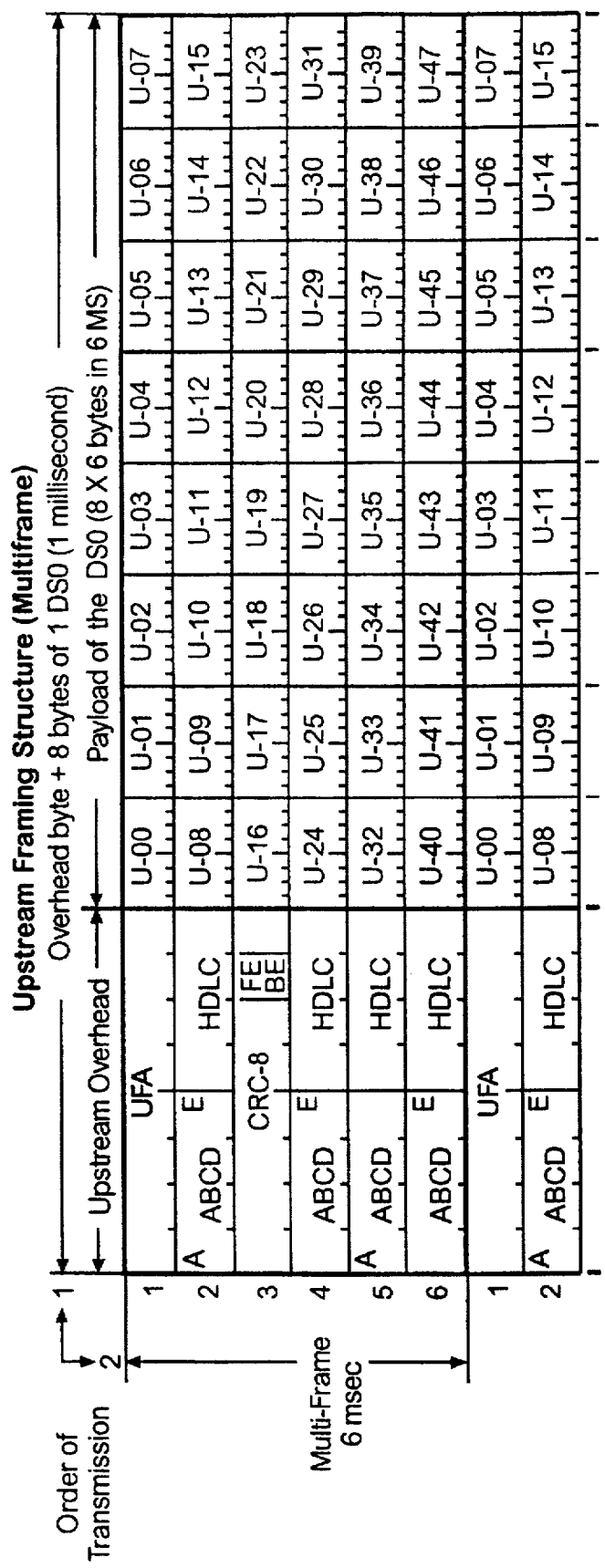
FIG. 10A is a pictorial representation of the framing protocol or data format of an embodiment of the upstream path signals utilized in the broadband communications system.

Framing sequences for an embodiment of the broadband communications system are described below with respect to FIGS. 10A–10C. In FIG. 10A, the data framing or data format for the reverse path data, also described as upstream channel data, used in an embodiment of the broadband communications system is shown. In FIG. 10A, the upstream channel data format, which is used for signals transmitted upstream in QPSK modulation, comprises six subframes to form a single super frame or multi-frame having a six millisecond pattern. Each subframe contains an overhead byte and 8 bytes of telephony signal data (DS0 data). The telephony signal data portion, which contains DS0 data, is commonly called the DS0 payload and comprises 48 bytes, numbered U-00 through U-47 in the multi-frame. The first byte is a fixed data pattern called the upstream frame alignment (UFA) and is used to indicate the beginning of the multi-frame. Specifically, the UFA is the first overhead byte of the first subframe of the multi-frame. The second, fourth, fifth, and six subframes include an overhead byte comprising (1) channel associated supervision bits designated ABCD and (2) HDLC reverse channel data representing message packets or bit-oriented status information. In contrast, the overhead byte within the third subframe contains a 6-bit cyclic redundancy code (CRC) based on the scrambled and encrypted bits of the previous multi-frame, excluding the upstream overhead data. This overhead byte also contains a far end block error (FEBE) bit that indicates whether the downstream channel frame and the CRC were received correctly. All bytes within the multi-frame, except for the upstream frame alignment byte, are preferably scrambled. The DS0 payload bytes are also preferably encrypted.

The 6-bit CRC, also described as a CRC-6 remainder, is calculated by the function $X^6+X+1$, which is defined by the CCITT G.704 for use with the E1 telephony format. This CRC computation can be used to evaluate the quality of the data transmission. The CRC-6 remainder is calculated for the scrambled and encrypted bits of the previous multi-frame, excluding the upstream overhead bytes. An incorrect CRC calculation on a received multi-frame is typically indicative of noise in the upstream or reverse channel, and an excessive of such CRC errors exceeding a predetermined threshold which may result in changing the carrier frequency to another upstream channel.

The channel associated supervision bits, designated ABCD, represent cycling bits which provide for 16 possible signaling states. For an embodiment of the present invention, the signaling bit definitions are: bit A=1 represents "on-hook"; bit A=0 represents "off-hook"; bit B=1 represents "not ringing"; and bit B=0 represents "ringing". It will be appreciated that the signaling bits can indicate required telephony signaling, such as on-hook, off-hook, and ringing status in the upstream direction. For example, the association between a subscriber's CIU and an on-hook or off-hook signal can be determined by the known association of a particular reverse channel frequency with a particular CIU address, which is maintained in a data base supported by the HIU. Alternatively, this association could be made by providing address information within the HDLC bytes that indicate which particular subscriber's equipment is indicating the particular signaling.

Figure 10B:
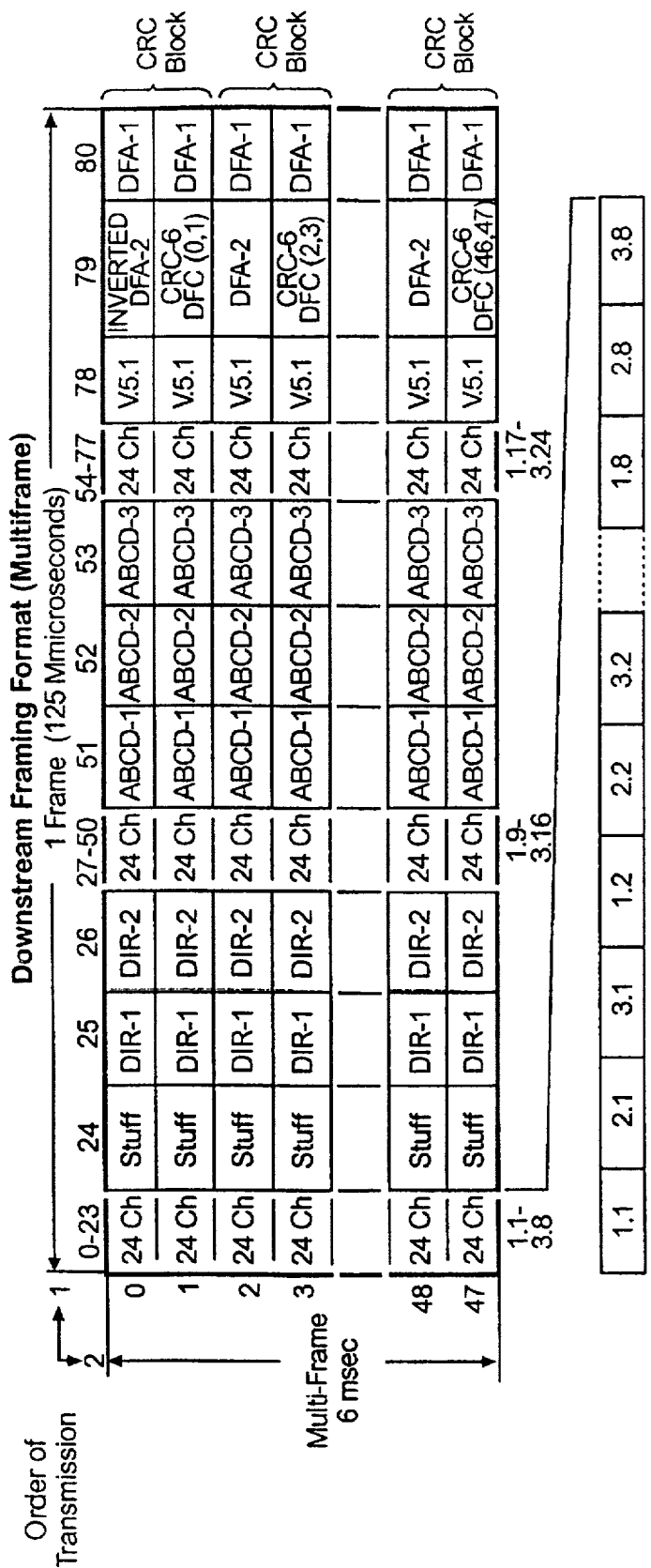
FIG. 10B is a pictorial representation of the framing protocol or data format (multi-frame) of the downstream path signals utilized in an embodiment of the broadband communications system.

FIG. 10B illustrates the data format or framing in the downstream path or forward path which is transmitted downstream in QPR modulation. The framing is organized as even and odd subframes of 81 bytes to allow for CRC computation. The subframes are grouped into multiples of 48 in a multi-frame or super frame. All bytes in each subframe except for the last two bytes (79, 80) are scrambled.

Each subframe contains 72 payload bytes, in bytes 0–23, 27–50, and 54–77 of the subframe. The telephony signal data bytes, also referred to payload bytes, may be encrypted. Byte 24, designated "stuff" contains arbitrary bit values for filling unused spaces and these bits have no significance or meaning within this framing format. Bytes 25 and 26 contain directory bits designated "DIR-1" and "DIR-2". Bytes 51–53 are reserved for ABCD signaling bytes, one byte per 24 channels of payload data. Byte 78 is reserved for a message-based signaling channel. Byte 80 is used for a downstream frame alignment pattern primary byte to indicate frame alignment. Similarly, for byte 79 of the even subframe, a downstream frame alignment pattern secondary byte is used for multi-frame alignment. Byte 79 of an odd subframe is used for a 6-bit CRC, which is calculated for the scrambled and encrypted bits of a two-subframe CRC block, namely the pair of even and odd subframes.

FIG. 10C illustrates the data format or framing structure in the forward or downstream path for a subframe of the multi-frame shown in FIG. 10B.

It will be understood that the frequency agile CIU is operative for modulating telephony and other signals from a subscriber in a plurality of frequency subbands in the upstream band of a broadband subscription network so as to provide selectably variable bandwidth in the upstream band commensurate with a selected subscriber communication feature such as single voice line, multiple voice lines, ISDN, security monitoring services, and the like. The bandwidth can be selectably allocated in discrete unit of DS0's, which will be understood can be combined to provide for higher capacity digital data channels in response to varying needs of subscribers. Furthermore, it will be understood that the frequency agile CIU is operative to reassign signals in a selected subband, such as UP1 ... UPn, to another subband at another frequency in response to a determination that the detected error threshold in a particular selected subband exceeds a predetermined level. Detected errors can arise as a result of noise or other channel impairments. Finally, an upstream data link for each carrier can be utilized by the CIU 400 to provide a general purpose data transport for alarm conditions, configuration information, etc.

Figure 11:
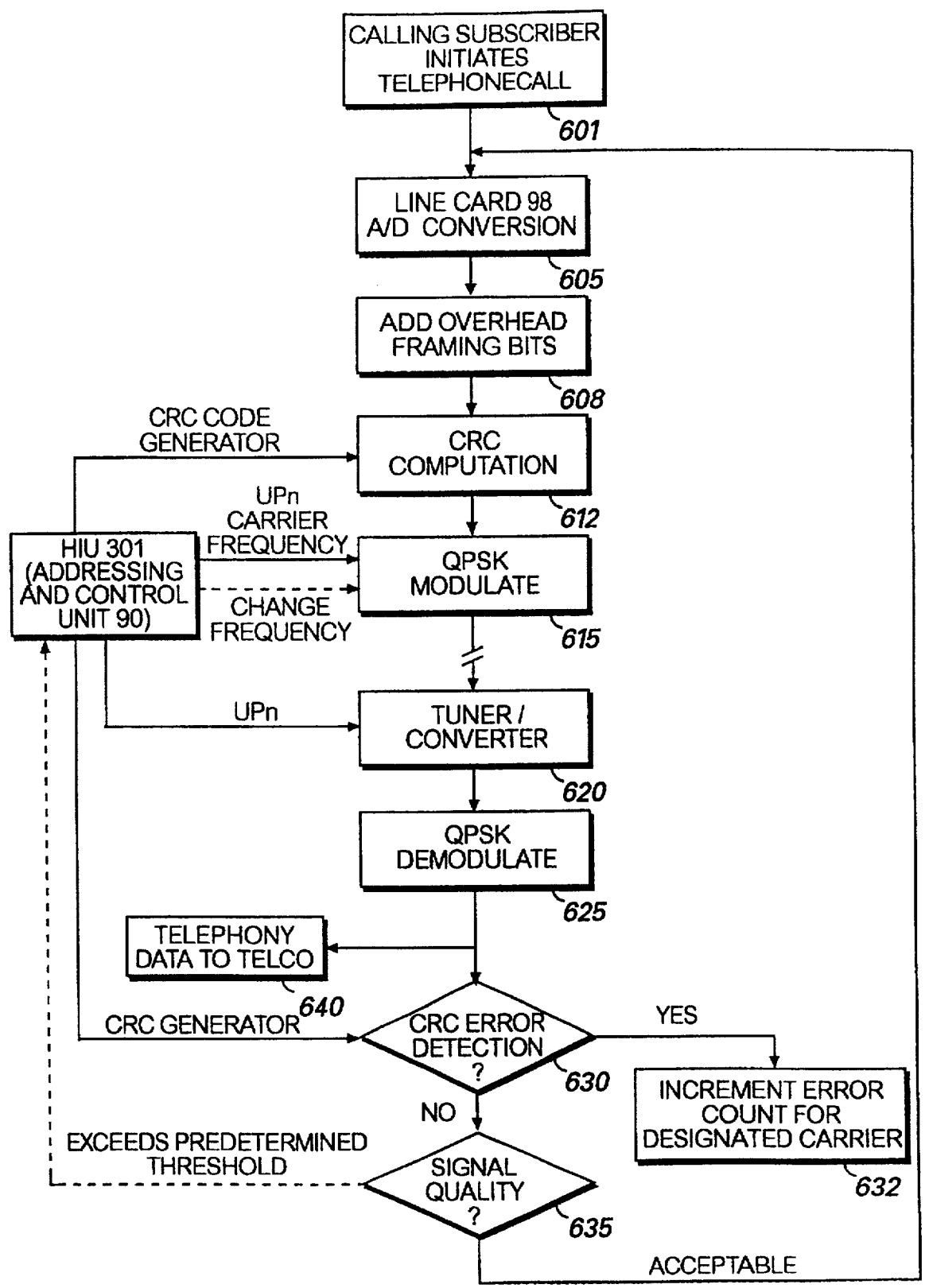
FIG. 11 illustrates the method carried out in the HIU and CIU of FIGS. 7 and 8 for dynamic bandwidth allocation and frequency assignment in the reverse channels.

In this regard, turn next to FIGS. 7, 8, and 11 for a discussion of the manner in which the broadband communications system operates to monitor noise level and allocate frequencies. FIG. 11 is a flow chart illustrating a sequence of operations wherein a calling subscriber initiates a communication and a request for telephony, and the equipment responds by allocating bandwidth and designating an upstream channel, broadcasting the identity of a selected channel in a downstream directory channel for receipt by the requesting CIU, measurement of signal quality in the channel, etc.

The process begins in step 601, where a calling subscriber initiates a telephone call by going "off hook" with telephony equipment connected to a line card 98'. Generally, the first step taken is to provide a signal indicative of the changed status of the telephony equipment in the upstream direction to the HIU equipment.

The change in status from "on hook" to "off hook" is communicated in the upstream signaling channel designated for use by the associated CIU. The changed status data is communicated upstream to the HIU 301 together with the CIU's address; the HIU is responsive to determine if it is appropriate that this particular subscriber remain at the designated upstream channel for communications of the telephony signals.

Assuming that a reverse channel has been assigned, the next step taken at 605 is to begin an analog to digital (A/D) conversion of the telephony signal in the line card 98' associated with the requesting subscriber, utilizing the CODEC 407 to obtain a digital data stream. The digital data stream is combined at steps 608 with framing bits by the CIU's CPU to obtain the frames and multi-frames.

At step 612, a CRC computation associated with the subframes and superframes is computed and added in the appropriate fields within the frame and subframe. At step 615, the multi-frame is provided to the reverse modulator 415, where it is transmitted on the broadband network upstream on the designated subband for upstream communications.

At the HIU 301, the particular upstream carrier frequency that was assigned for upstream communication is also provided to the CIU discussed with respect to FIG. 8. The selected reverse demodulator 330 at step 620 then tunes to the designated upstream channel UPn. At step 625, the selected demodulator then demodulates the signal into the 72 kbps data stream. The digital data stream is extracted from the multi-frame by examining the framing bits for delimiting the multi-frame.

In step 630, the CRC values associated with the multi-frame are examined, and if the CRC is incorrect, the error count associated with a designated upstream channel is incremented. In the event that the error count exceeds the predetermined threshold within a predetermined time period, as measured by the HIU computer, it is deemed that the channel is impaired. This is shown at step 632. At step 635, the error count is compared on a periodic basis to the predetermined error count threshold to determine if the detected number of errors exceeds acceptable levels. At step 635, so long as the signal quality is acceptable, there is no need to change frequencies for upstream communications. On the other hand, in response to a determination that the error count exceeds the predetermined threshold from step 635, the HIU 301 is operative to change the carrier frequency.

If the signal quality at step 635 is acceptable, the method returns to step 605 and continues to transmit telephony data in the manner described.

In the event of a detection of an error, the data is not retransmitted from the CIU to the HIU. Rather, the data is demodulated and provided at step 640 to the telco line associated with a particular subscriber for communications on the telephony network.

Figure 12:
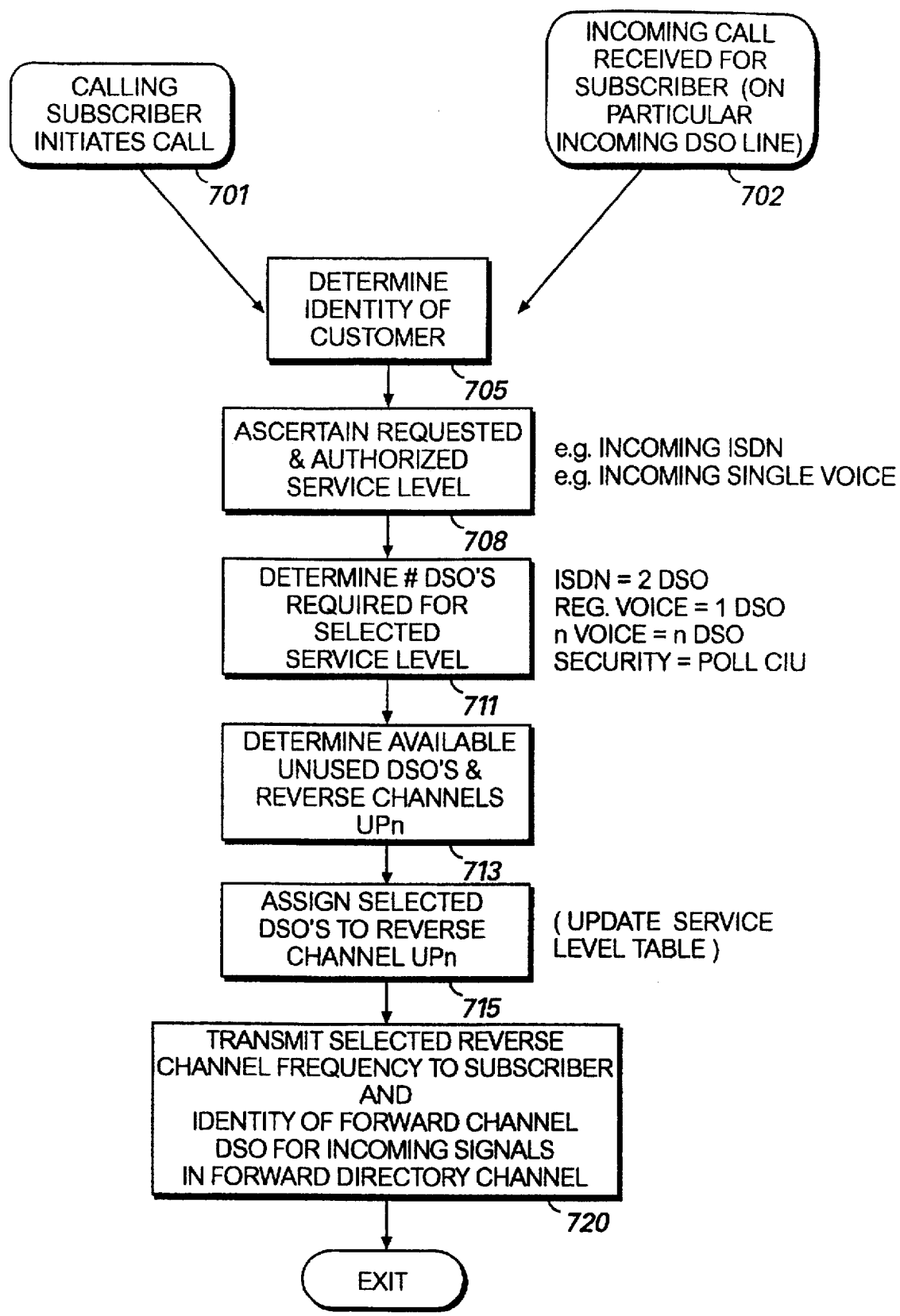
FIG. 12 illustrates the method carried out in the HIU and CIU of FIGS. 7 and 8 for handling a communication for a caller.

FIG. 12 illustrates a method of dynamic bandwidth allocation in response to selected levels of service requested by subscribers. There are two pathways for invoking the method involved with dynamic bandwidth allocation on behalf of a customer: (1) when a calling subscriber initiates a request for telephony service originating at CIU, and (2) when an incoming call is received for a subscriber on a particular incoming telco DS0 line from the telephony network. Both pathways require that the system determine the appropriate level of service, and commensurate bandwidth, for the call. These steps are shown at 701 and 702, respectively. It will be appreciated that the remaining steps are substantially the same regardless of whether the subscriber initiates a call or an incoming call is received for the subscriber.

In a case where the calling subscriber initiates the call at step 701, the procedures described in connection with FIG. 12 of providing the "off hook" status information is provided in the designated upstream channel to the HIU 301, so that an appropriate upstream channel can be assigned, if one is not assigned by default.

Next referring to step 705, in response to receipt of the status information indicating a request for service (such as an "off hook" status), or receipt of an incoming call at the HIU, the identity of the customer is ascertained by inspecting a database maintained in memory by the HIU 301.

At step 708, the requested and authorized service level for the identified customer is ascertained. This entails determining, for example, that the subscriber has requested service such as ISDN and is authorized to receive ISDN service, or other similar service levels such as single line voice, multiple line voice, data communications, security services, etc.

At step 711, after the appropriate authorized and requested service level has been ascertained for the particular subscriber, the number of DS0's required for the selected service level are determined. For example, ISDN requires at least two DS0's (and possibly more if 2B+D service is provided), a single regular voice channel requires one DS0, plural voice channels require plural DS0's, security requires periodic monitoring of the CIU, etc.

At step 713, the selected number of required DS0 data channels is determined, by using in index to the service table that is sorted numerically by telco DS0 number, to determine which DS0's are unused and may be selected and assigned for use to satisfy the service request. Likewise, a corresponding number of reverse channels UPn are determined for the selected service level.

At step 715, the selected one or more DS0's in the reverse channel are associated with particular DS0 channels from the telephony network, or in the case of an incoming call, the particular incoming DS0 line from the telephony network is associated with the selected one or more DS0's in the reverse channel. The selected DS0's are then assigned to one or more corresponding reverse channel frequencies UPn. In this regard, a database is updated to reflect the correspondence between telephone DS0 channel numbers and reverse channel frequencies in the upstream spectrum.

Finally, at step 720, selected reverse channel frequencies are transmitted to the particular subscriber in the forward directory channel, by transmitting the CIU address and upstream channel identification. The identity of the forward channel DS0 is also identified for incoming signals in the forward directory channel so that incoming signals from the telephony network can be routed to an appropriate forward channel frequency and DS0 channel for provision to the subscriber CIU, which monitors the appropriate DS0 channel in the forward spectrum. In this manner, it will be understood and appreciated that bandwidth may be allocated in a selectably variable manner so as to provide for appropriate levels of service that have been selected by a customer.

Figure 13:
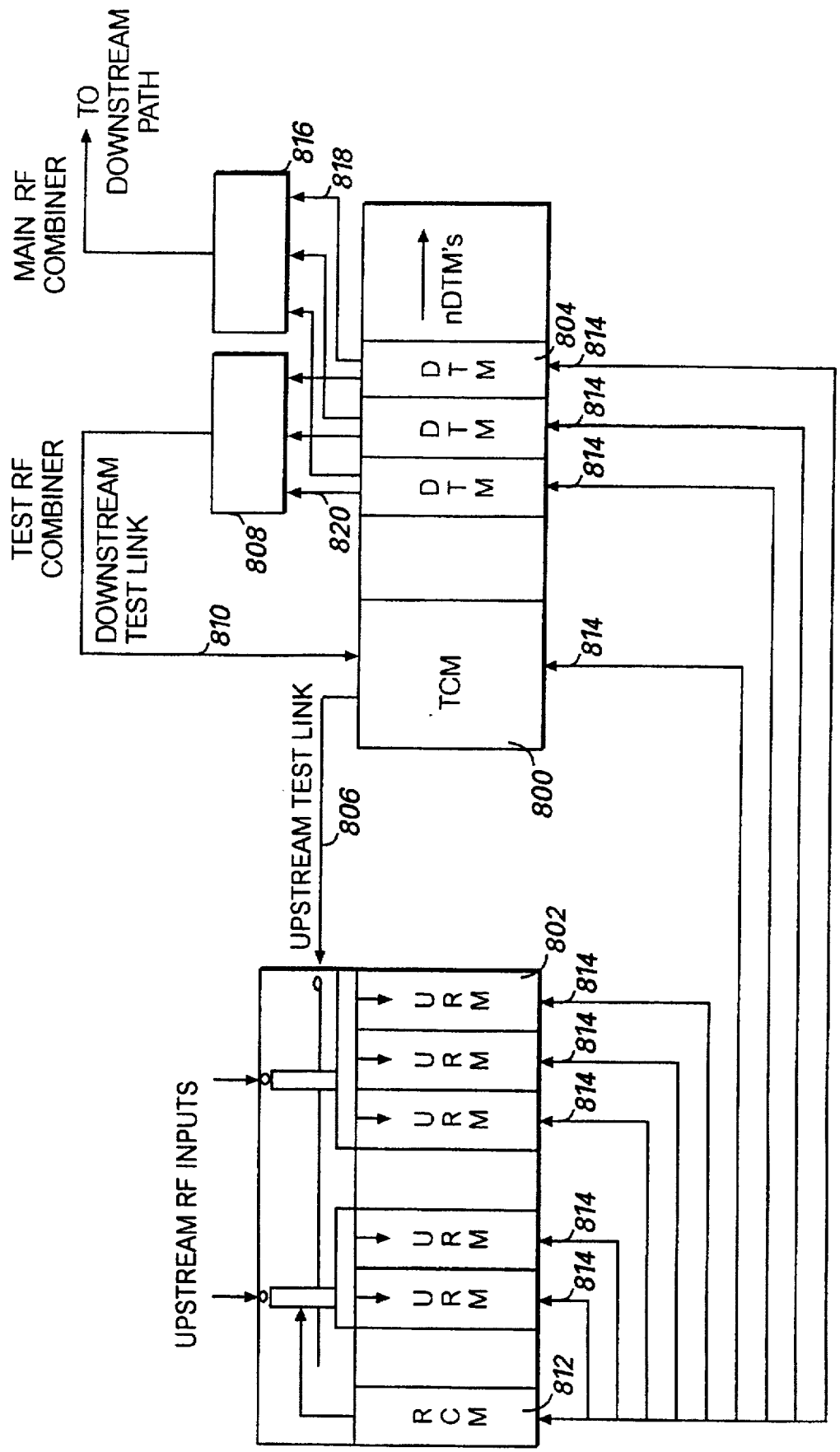
FIG. 13 is a block diagram illustrating the operating environment for an embodiment of the present invention.

FIG. 13 is a block diagram illustrating a test facility located at the headend interface unit (HIU) of the broadband communications system. Referring now to FIGS. 3C, 7 and 13, a test control module (TCM) 800 is connected to multiple upstream receiver modules (URMs) 802 and downstream transmitter modules (DTMs) 804. The TCM 800 is connected to each URM 802, also called a demodulator, via an upstream test link 806, which carries radio frequency (RF) test signals during an upstream receiver test. Each DTM 804 is connected to the TCM 800 via the combination of a test RF combiner 808 and a downstream test link 810. The combiner 808 operates to combine the transmit signals output by each DTM 804 and outputs the resultant signal to the TCM 800 via the downstream test link 810 during a downstream transmitter test. The TCM 800, the URMs 802, and the DTMs 804 are connected via bidirectional data communication links 814 to an RF control module (RCM) 812.

The URMs 802, the DTMs 804, and the RCM 812 represent functions conducted by components of the headend interface unit (HIU) 301 shown in FIGS. 7 and 9. Specifically, the URMs 802 correspond to the reverse demodulators 330a–330n; the DTMs 804 correspond to the forward modulators 320a–320n; and the RCM 812 corresponds to the processing unit 308.

The RCM 812 controls the RF signal operations conducted by the TCM 800, the URMs 802, and the DTMs 804 by transmitting control signals to each of these modules via the data communication links 814. The RCM 812 preferably has individual communications links with each URM 802, each DTM 804, and the TCM 800. In essence, the RCM 812 can be viewed as a "traffic cop" for directing the reception and transmission of RF signals, including test signals required for the upstream receiver and downstream transmitter test conducted by the TCM 800.

Although FIG. 13 shows a single RCM 812, the preferred implementation of the HIU 301 includes a pair of RCMs, a first RCM that remains on-line and a second RCM that operates in a stand-by mode. The second RCM provides an alternative RCM element in the event of a failure of the first RCM. Consequently, the connections shown for the RCM 812 in FIG. 13 would be duplicated for the second "standby" unit.

The TCM 800 conducts test operations to support an evaluation of the operating state of the URMs 802 and the DTMs 804. To test upstream receive operations at the HIU 301, the TCM 800 generates a test signal stream carried by the upstream test link 806 to a selected URM 802. Likewise, a selected DTM 804 can generate a test signal stream carried via the combination of the combiner 808 and the downstream test link 810 to the TCM 800. Thus, it will be appreciated that the TCM 800 includes a transmit function for transmitting an upstream test signal stream and a receive function for receiving a downstream test signal stream.

For the preferred embodiment, the transmit function of the TCM 800 is implemented by an upstream transmitter similar to the module used by the customer interface unit 400, such as a reverse modulator 415. Likewise, the receive function of the TCM 800 is preferably implemented by a downstream receiver similar to the module used by the CIU 400 such as the forward demodulator 420. The upstream test and downstream test operations conducted by the TCM 800 are supported by the RCM 812, which directly controls the RF operations of the URMs 802 and the DTMs 804. The principal components of the TCM 800 will be described in more detail with respect to FIG. 14.

During conventional communication operations, the URMs 802 receive and process RF carrier signals that are transported via the upstream or reverse signal path of the CATV network 12. Each URM 802 typically comprises a group receiver, a framer/demultiplexer, and a processing unit. Each URM 802 can receive groups of up to 25 contiguous data channels, each originating from a subscriber of communication services via a CIU 400. Each channel can carry up to 64 kilobytes per second of subscriber data and 8 kilobytes per second of control (or customer) data. Upstream data channels are preferably spaced by 49.5 kHz intervals. Each URM 802 can accept control commands from the RCM 812 and, in response, tune to a particular allocated upstream frequency to acquire a desired RF carrier signal. A received upstream carrier signal can be demodulated by the URM 802 to obtain channel information, which is subsequently passed to the RCM 812 via the data link 814.

As shown in FIG. 13, each DTM 804 preferably has two outputs, a main RF output 818 and a test RF output 820. The main RF output 818 is used by the DTM 804 for transmitting downstream signals to CIUs 400 via the CATV network 12, whereas the test output 820 is used for transmitting downstream test signals for reception by the TCM 800. Each main RF output 818 is connected to a main RF combiner 816, whereas each test RF output 820 is connected to the test RF combiner 808. The main RF combiner 816 sums the main RF outputs 818 and outputs a resultant signal to the downstream or forward signal path of the CATV network 12. The test RF combiner 808 sums the test RF outputs 820 and outputs a resultant signal via the downstream test line 810 to the TCM 800.

Each DTM 804 can receive downstream data from the RCM 812 and, in response, modulate this information onto a downstream carrier signal. To accomplish this modulation function, the RCM 812 selects a DTM 804 and forwards the downstream data to the selected DTM 804 via the appropriate data communication link 814. In turn, the selected DTM reformats the downstream data and modulates this data onto a downstream carrier signal. Although the preferred modulation format is 9-QPRS, those skilled in the art will understand that other modulation schemes can be employed by the DTM 804. The main RF combiner 816 accepts the downstream signal output by each DTM 804 and, in response, outputs a combined downstream signal representing the summed combination of downstream signals output by the DTMs 804. Another combiner (not shown) can combine the DTM output signals with other broadcast signals to generate a composite signal that will feed the downstream fiber transmitter.

The RCM 812 coordinates and controls all RF parameters of the HIU 301, including the individual components of the testing system, such as the TCM 800, the URM 802, and the DTM 804. The RCM 812 also communicates with a time slot interchange (TSI) module (not shown) that performs the functions of: (1) time slot interchange, (2) system clock generation, and (3) data link termination. The time slot interchange function supports switching of any DS0 time slot on any input channel to any DS0 time slot on any output channel. Each channel can provide a 10 bit data sequence spaced by a time interval of 125 microseconds. Each data communication link 814 is preferably implemented by a Peripheral/Core Interface (PCI) link. For example, DS0 data is preferably communicated between the RCM 812 and the TSI module via a communication link at 51.84 Mbps.

For the implementation of a telephony network, it is desirable to provide reliable communication services similar to at least the present quality of telephony services supported by a conventional twisted-pair implementation of a public switched telephone network. The TCM 800 supports detection and evaluation of communication problems at the HIU 301. For example, for signal reception problems, an upstream signal channel can be corrupted by interference signals, such as local ham radio transmissions, two-way public radio equipment, broadcast services, and so forth. This type of interference is commonly described as ingress noise or interference. Ingress noise is a significant problem for signal reception at the HIU because interference signals that enter the upstream signal path are cumulative in effect at the headend. This cumulative interference effect results from the tree and branch system of the conventional CATV network.

To determine the vulnerability of a selected reverse channel to ingress noise, it is useful to inject a combination of a known test signal and present reverse channel signal(s) into a selected URM 802. This combination of the known test signal and the signals present on a selected reverse channel can be achieved by a switching mechanism, or a combination of a coupling device and a switching mechanism, located proximate to the URMs 802. If the selected URM 802 detects the known test signal, which is generated by the TCM 800, with minimal distortion, then this test result suggests that the URM is properly operating and the selected reverse channel has a negligible amount of ingress. This test, which is called an ingress test, determines the operating state of the URM 802 and the selected reverse channel, is based on the amount of errors associated with the detected known test signal. This ingress test also provides evidence of the amount of interference for a particular reverse channel during the time of the test. For example, if a reverse channel is associated with a high level of interference, it would be desirable to retune the URM 802 to another reverse channel that may be free of interference. Alternatively, the upstream test may indicate that the URM under test has entered a fault state and, if so, this URM can be replaced by a protection module.

Another type of upstream test involves the injection of only an upstream test signal into a selected URM 802. This test is useful for evaluating the health of the selected URM. For example, an upstream test signal having a known signal characteristic can be injected into the selected URM. In turn, the test information associated with the detection of the upstream test signal by the selected URM can be compared to the known characteristic of the upstream test signal. Based on a quality threshold, a determination can be made regarding the operating state of the selected URM. The test is commonly called a "return to service" test because it is typically used to examine the present operating state of a URM that had previously entered a fault state. Significantly, the return to service test does not generate any information regarding the condition of the upstream signal path that may be connected to the URM. Indeed, the upstream RF input to the selected URM 802 can be switched to a matched load to prevent injecting the upstream signals into the selected URM during the return to service test.

With respect to downstream test operations, the TCM 800 can support an evaluation of the quality of the downstream transmit signal output by a DTM 804. In the event that the downstream signal received by the TCM 800 does not satisfy a predetermined quality threshold, a determination can be made that the DTM 804 has entered a fault state. Based on this determination, the RCM 812 can substitute a protection module for the failed DTM.

Test results for upstream and downstream tests are generally defined by the number of errored seconds, i.e., the number of seconds in which an error occurred, the number of bit errors for a predetermined test interval, and the bit error rate (BER). For a common time period during an error detection sequence, the BER can be defined by a ratio of the number of bits in error to the total number of bits in the data stream. Based on the generation of a known bit sequence, an error can be detected during test operations by comparing the known data sequence to the received data sequence. In the event that the error count exceeds a predetermined threshold within a predetermined time period, a determination can be made that a fault condition exists. For example, for an upstream test, the corresponding upstream channel may be excessively noisy or the URM under test has failed. For a downstream test, an excessive error count or rate indicates that the DTM under test has failed. If the error count or rate is acceptable, then there is no need to replace a URM or a DTM with a protection module or to retune one of these units. On the other hand, in response to a determination that the error count exceeds the predetermined threshold, it may be necessary to take one of these corrective actions.

To support either an upstream test or a downstream test, the RCM 812 provides the TCM 800 with desired test parameters, including test period interval and type(s) of requested test measurements. The types of test measurements include measurements of errored seconds, bit errors, bit error rate, and framing errors. Although these test measurements are computed by the TCM 800, the overall results of these test measurements are reported back to the RCM 812, where they can be stored within a memory storage device. For example, a database can be maintained by the RCM 812 to document the results of previous upstream and downstream tests. The records of this database can document the particular URMs 802 and DTMs 804 corresponding to satisfactory test results. These database records can be sorted to define the URMs and DTMs operating in a proper state (rather than a fault state) during test time, and equipment can be allocated to support HIU operations based on that sorted order.

When test activity is required, the TCM 800 receives test instructions from the RCM 812 via a data communication link 814. For an upstream test, a URM 802 is selected to determine whether this module is properly receiving upstream signals. In addition, a switching mechanism (not shown) located at the URMs 802 is controlled to direct the desired input signals to the selected URM 802. For example, for an ingress test, the combination of a known test signal and the signals present on the selected upstream channel are directed to the input of the selected URM 802. Alternatively, the known test signal alone can be input to the selected URM 802 to determine the health of this device. An upstream transmitter of the TCM 800 is activated and, in response, the upstream test signal is output to the upstream test link 806. The selected URM 802 receives and demodulates the upstream test signal (and, for an ingress test, upstream signals present on the selected upstream channel) and, in turn, forwards received data to the TCM 800 via the RCM 812. Because the TCM 800 is not directly connected to the related URM 802, the bit sequence is routed by the RCM 812, which is connected to the TCM 800 and the selected URM 802. The TCM 800 can conduct statistical measurements in response to receiving the received data stream output by the selected URM 802. Upon completion of these measurements, the TCM 800 sends the measurement results to the RCM 812 via a data communications link 814. Typical test results include errored seconds, bit errors, BER, and framing errors.

For a downstream test, a DTM 804 is selected by the RCM 812 to determine whether the selected DTM has entered a fault state. To support the downstream signal test, the RCM 812 activates a downstream receiver within the TCM 800. The RCM 812 then commands the selected DTM 804 to switch its output to the downstream test output 820, which is fed to the test combiner 808. The downstream test signal, which is output by the DTM under test, is passed by the test combiner 808 and carried to the TCM 800 via the downstream test link 810. The downstream receiver within the TCM 800 decodes the test signal to generate a stream of demodulated data. The TCM 800 can then perform statistical measurements upon the demodulated data to support a determination of whether the selected DTM 804 has entered a fault state. The TCM 800 outputs the measurement results to the RCM 812 via a data communication link 814. The RCM 812 is responsible for analyzing the test results to determine the operating state of the DTM under test.

In response to determining that a URM 802 or a DTM 804 has entered a fault state, the RCM 812 can elect to disable the failed module and to substitute a protection module. For example, if the upstream test results indicate that the URM under test has failed, the RCM 812 can substitute a protection URM in place of the failed module. Likewise, the RCM 812 can substitute a protection DTM in place of a failed DTM in response to downstream test results indicating that the DTM has entered a fault state. The protection URM and the protection DTM are typically implemented by a respective "spare" URM 802 or DTM 804 that is held in reserve for a protection function. Consequently, it will be appreciated that at least one of the URMs 802 and the DTMs 804 shown in FIG. 13 are held in reserve as protection modules. These protection modules provide equipment protection in the event of device failure.

In response to detecting a failure of a URM 802, the RCM 812 can redirect upstream signals originally intended for the failed URM to the protection URM. Specifically, the RCM 812 achieves this transfer of upstream signals by controlling one or more switches that determine the connection of URM inputs to the communications network. Because the RCM 812 maintains a database of upstream frequencies allocated to each URM 802, the RCM 812 can direct the protection URM to tune to the frequency range previously assigned to the failed URM. Thus, the protection URM may be tuned to the same frequency as the failed unit and can take over the upstream receive function.

In the event that the RCM 812 determines that a DTM 804 has entered a fault state, the RCM can protect the failed DTM by replacing it with a protection DTM. Specifically, the RCM 812 can disconnect the main RF output of the failed DTM by controlling the operating state of a switch connected between the failed DTM and the main RF combiner 816. The switch is preferably located immediately before the output port of the DTM such that a minimal number of components separate the switch from the output port of the DTM. In turn, the RCM 812 can command the protection DTM to tune to the carrier frequency of the failed DTM and connect its primary RF output to the node previously assigned to the failed DTM. In this manner, the protection DTM can assume the transmit task previously assigned to the failed DTM.

Figure 14:
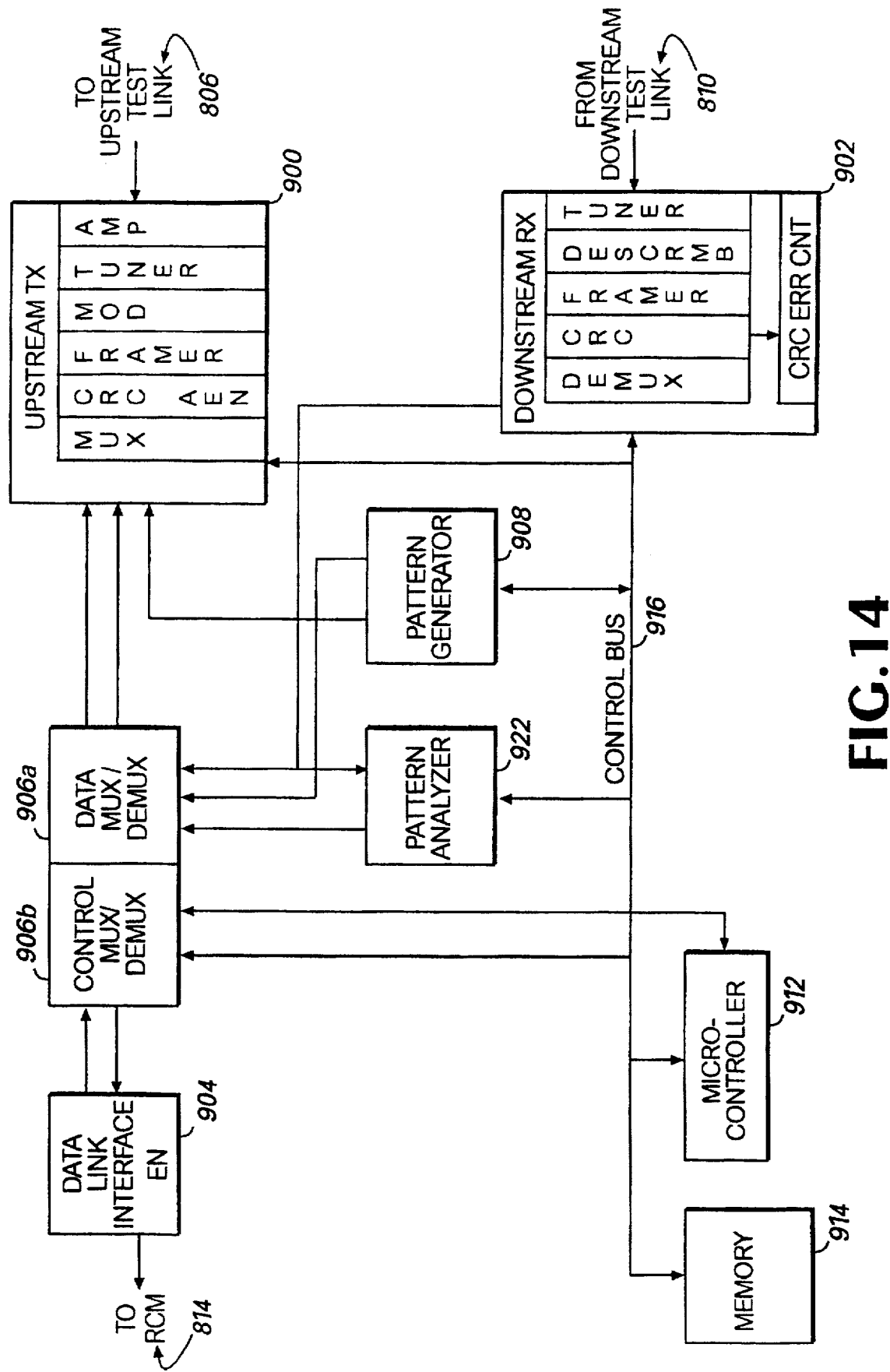
FIG. 14 is a block diagram illustrating a preferred embodiment of a test module of the present invention.

FIG. 14 is a block diagram illustrating the principal components of the TCM 800. Referring now to FIG. 14, the upstream test link 806 is connected to an upstream transmitter 900 and the downstream test link 810 is connected to a downstream receiver 902. The RCM 812 is connected to a data link interface 904 via the data communications link 814. The upstream transmitter 900 outputs an upstream test signal onto the upstream test link 806, whereas the downstream receiver 902 accepts a downstream test signal from the downstream test link 810. For bidirectional communications between the TCM 800 and the RCM 812, the data link interface 904 accepts command signals from and outputs data signals onto a data communication link 814 connected to the TCM.

The microcontroller 912, which is connected to memory 914, controls internal functions of the TCM 800 and is connected via a control bus 916 to the upstream transmitter 900, the downstream receiver 902, multiplexers/demultiplexers 906a and b, a pattern generator 908, and a pattern analyzer 922. The microcontroller 912 controls manipulation of data streams for both upstream and downstream tests conducted by the TCM 800. The microcontroller 912 interprets and responds to commands from the RCM 814 and can generate bit streams that control the remaining elements of the TCM 800. The microcontroller 912 is preferably implemented by a model 68360 microprocessor, which is distributed by Motorola Corporation. The memory 914 preferably includes both FLASH memory and random access memory (RAM).

The data multiplexer/demultiplexer 906a is connected to the upstream transmitter 900, the downstream receiver 902, a pattern generator 908, and a pattern analyzer 922. The data multiplexer/demultiplexer 906a extracts data from signals forwarded by the data link interface 904 and can supply this information to the upstream transmitter 900, the downstream receiver 902, the pattern generator 908, and the pattern analyzer 922. The data multiplexer/demultiplexer 906a also can receive signals from one or more of these connected devices and forward this information to the data link interface 904 for subsequent transmission to the RCM 812.

The control multiplexer/demultiplexer 906b, which is connected to the microcontroller 912 via the control bus 916 and to the data link interface 904, routes commands from the RCM 814 to the microcontroller 912.

The pattern generator 908 supports the generation of test pattern and tone sequences, including known data sequences that can be used for modulating carrier signals generated by the upstream transmitter 900. The test pattern and tone sequences generated by the pattern generator 908 are useful for supporting both upstream and downstream test operations. The pattern analyzer 922 supports the analysis of data sequences received and decoded by the downstream receiver 902.

The upstream transmitter 900 is similar to the reverse modulator 415 of the CIU 400 shown in FIG. 8. To generate a properly formatted upstream test signal, the upstream transmitter 900 includes the functions of a multiplexer, a CRC generator, a framer, a modulator, a tuner, and an amplifier. The upstream transmitter can accept modulation information generated by the pattern generator 908 for modulating a carrier signal. The pattern generator 908 typically generates a bit stream having predetermined characteristics. For example, the pattern generator 908 can generate a pseudo-random bit stream (PRBS) that defines a known bit sequence having certain statistical properties. Common PRBS patterns include a bit sequence of length characterized by one less than the number "2" raised to the power of 6, 9, 11, 13, or 15 ($2^n-1$, where n=6, 9, 11, or 13). For example, the PRBS-6 pattern defines a pattern bit sequence of 63 bits that is repeated during the length of the data stream. It will be understood that other known data sequences can be generated by the pattern generator 908.

The downstream receiver 902 includes the functions of a demultiplexer, a CRC analyzer, a framer, a descrambler, and a tuner to support the reception of a downstream test signal. The downstream receiver 902 is similar to the forward demodulator 420 of the CIU 400 illustrated in FIG. 8. For a downstream test, the downstream test signal is received by the downstream receiver 902 and a decoded version of this downstream test signal can be output to the data multiplexer/demultiplexer 906a. Test signals received and decoded by the downstream receiver 902 also can be supplied to the pattern analyzer 922 to support the measurements conducted by the TCM 800.

Figure 15:
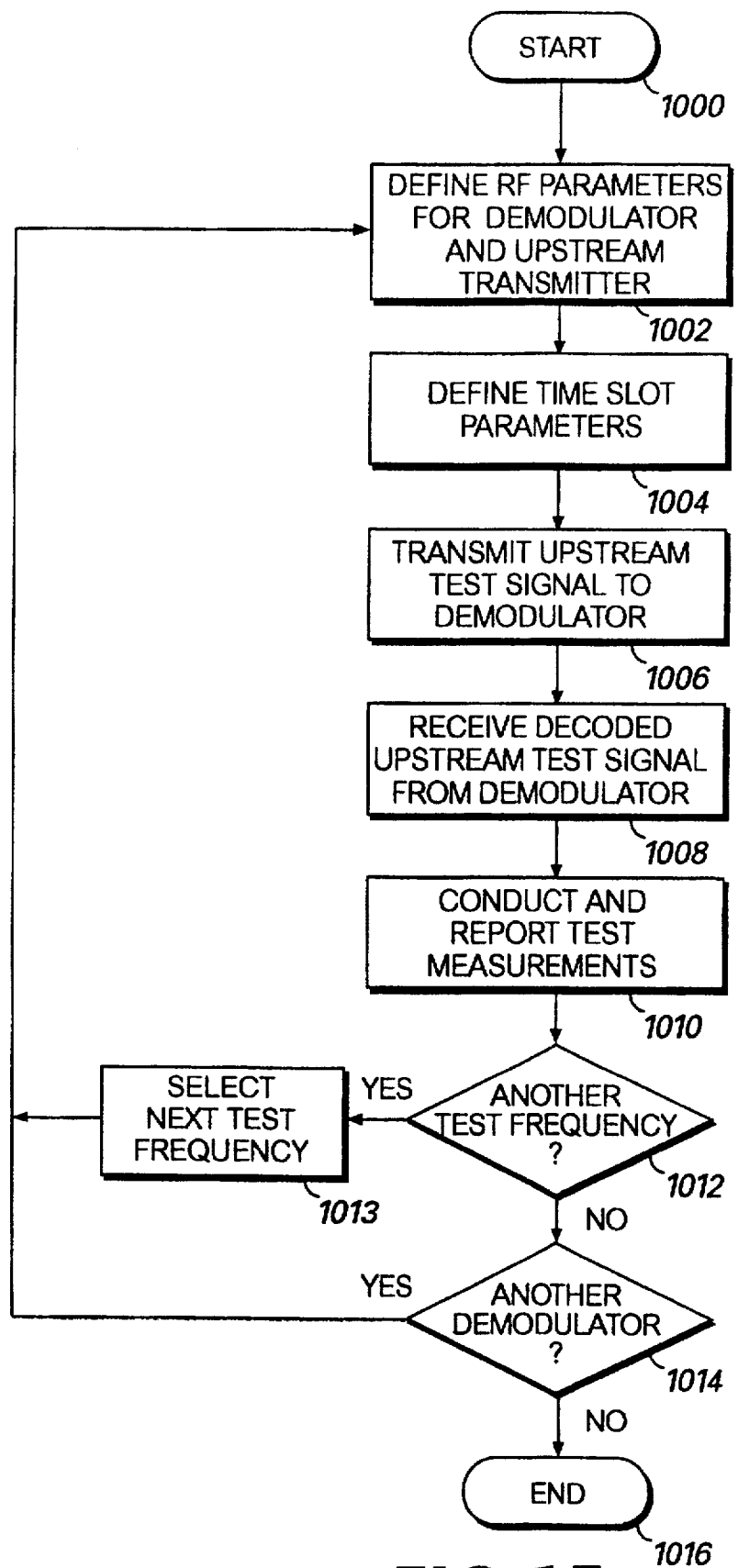
FIG. 15 is a logical flow diagram illustrating the steps for a process of conducting an upstream test for an embodiment of the present invention.

FIG. 15 is a logical flow diagram generally illustrating the steps of an upstream test conducted by the TCM 800. The RCM 812 controls upstream test operations by selecting a device to be tested and assigning a particular frequency for receive operations by the selected URM 802. The RCM 812 also commands the upstream transmitter 900 to generate an upstream test signal at a selected test frequency corresponding to the receive frequency assigned to the selected URM. As required, the RCM 812 also can instruct the upstream transmitter 900 to generate the upstream test signal at a particular RF power level. The upstream test signal comprises a predetermined bit sequence selected by the RCM 812 and generated by the pattern generator 908. The RCM 812 also instructs the TCM 800 regarding the test parameters for the upstream test, including the test period interval and the desired type of measurement results.

The upstream test can be conducted by injecting into the selected URM 802 either (1) an upstream test signal output by the upstream transmitter 900 or (2) a combination of the upstream test signal and any signal(s), including interference, present on the upstream channel. The first type of upstream test, known as a "return to service" test, will support an evaluation of the operation of the selected URM 802 based only on detection of known test signal characteristics. In contrast, the second type of test, typically called an "ingress" test, represents an evaluation of the spectrum of the upstream channel and the operation of the selected URM 802 based on an exposure to this signal spectrum. Thus, the second type of upstream test supports an evaluation of whether ingress noise is corrupting the detection process conducted by the selected URM 802. These types of upstream tests can be conducted either singularly or in combination to determine the health of the selected URM 802. A selection regarding the type of upstream test to be conducted is completed prior to the start of test operations because certain signal path switching operations may be required to inject the desired signals for the selected test. For example, to conduct an ingress test, the upstream test signal generated by the TCM 800 can be combined with signals present on a selected upstream channel based on the operating state of a switching system located proximate to the URMs 802. This combination of signals, including a known test signal, is input to the selected URM 802 for the ingress test. A switching system for an embodiment of the present invention is described in detail below with respect to FIG. 18.

Referring now to FIGS. 13, 14, and 15, upstream test process begins at the START step 1000 and proceeds to step 1002 to define RF characteristics for a selected URM 802 and the upstream transmitter 900. A URM 802 is selected as the test device and the selected URM is tuned to an assigned test frequency. Preferably, the selected URM 802 has not been previously allocated for conventional communication operations and the selected frequency represents a frequency not allocated for upstream communications between the HIU 301 and a CIU 400. Because a range of unallocated frequencies may be available, the highest possible unallocated frequency is preferably selected to initiate the upstream test. High frequencies (above 15 MHz) are preferred because of reduced probability of ingress. RF switches at the inputs to the URMs 802 are also controlled as required to route the upstream test signal to the selected URM.

The upstream transmitter 900 also tunes to a selected carrier frequency and an assigned data pattern is obtained for modulating this carrier frequency. The data pattern is typically defined by a known bit pattern sequence, such as a conventional PRBS pattern that is useful for supporting a bit error rate test. Although commands from the RCM 812 define the selection of this bit pattern sequence, the selected bit pattern sequence is generated by the TCM 800 based on the operation of the pattern generator 908. Commands received by the TCM 800 from the RCM 812 also specify certain test parameters, which define the analysis operations to be completed upon the detected information output by the selected URM.

In step 1004, time slot parameters are defined for the signal exchange between the TCM 800 and the selected URM 802. The RCM 812 determines the time slot parameters, which define time slots that will be used to support exchange of information between the TCM 800 and the URM 802 during the upstream test. Specifically, the RCM 812 controls the time slots that will be used for a data exchange between URM 802 and the TCM 800 during the upstream test. For example, certain time slots must be identified to support the exchange of test information between the URM 802 and the TCM 800.

In step 1006, the upstream transmitter 900 generates the upstream test signal in response to the modulation information of a specified PRBS pattern supplied by the pattern generator 908. The URM 802 receives the upstream test signal via the upstream test link 806 and a switching system that controls the connection of signal paths to the selected URM. Based on the operation of this switching system, the upstream test signal can be combined with present upstream channel signals at the input of the URM 802 to determine whether interference is corrupting the upstream channel. This combination of the known test signal and the spectrum on the upstream channel supports the ingress test function. Otherwise, the upstream test signal can be applied directly to the input of the URM 802 to determine the operating state of this URM based on a comparison of the specified PRBS pattern to the demodulation of an upstream test signal having the specified PRBS pattern.

The demodulation operations completed by the URM 802 produce test information that can be forwarded to the TCM 800 for processing. In step 1008, the URM 802 places the test information in an identified time slot for transmission to the RCM 812. In response, the RCM 812 forwards this bit sequence (in another time slot) to the TCM 800 via a data communications link 814.

In step 1010, the TCM 800 conducts an analysis of the test information and generates test results. These test results, which are supplied to the RCM 812, can include a variety of statistical measurements of the test information, including errored seconds, bit errors, and a bit error rate. The TCM 800 reports these measurement results to the RCM 812 via a data communication link 814 connecting these units. In turn, the RCM 812 can store the measurement results within a memory storage device for subsequent analysis. The measurement results can be organized within a database maintained in internal memory. This database can be used by the RCM 812 for the allocation of upstream frequencies for use by the URM 802. For example, this database can be used to track the operating state of each tested URM based on the upstream test results associated with these receivers.

In step 1012, an inquiry is conducted to determine whether an upstream test should be conducted for the selected URM 802 at another frequency, such as an available frequency positioned at a higher portion of the spectrum. If the response to the inquiry is negative, the "NO" branch is followed to step 1014. If another test frequency is available, the "YES" branch is followed from step 1012 to step 1013 and another frequency is selected for the upstream test signal. A loop is followed from step 1013 to step 1002, and an upstream test is conducted for the selected URM at this new frequency. Preferably, available frequencies are examined in order, one at a time, from the top to the bottom of the allocated frequency spectrum for upstream signals.

In step 1014 a determination is made whether an upstream test should be conducted for another URM 814 of the HIU 301. If so, the "YES" branch is followed from step 1014 to step 1002 to initiate an upstream test for a newly selected URM. However, if the response to the inquiry in step 1014 is negative, the "NO" branch is followed to step 1016 and the test process terminates.

Although the upstream test has been described with respect to applying an upstream test signal to a selected URM 802, those skilled in the art will appreciate that the framing format for the telephony signals carried by an embodiment of broadcast communications system also can be used for interleaving a test signal that is communicated between the HIU 301 and the CIU 400. For example, a PRBS pattern can be inserted within one or more selected frames of the framing format in an upstream signal to support an examination of the decoding capability of URM 802 assigned to the frequency of this upstream signal. In this manner, a testing capability is embedded within the framing format used for upstream signals transmitted by the CIU 400 to the HIU 301.

FIG. 16 is a logical flow diagram generally illustrating the steps of a downstream test based on the use of a bit pattern generated by the DTM. The RCM 812 issues commands via appropriate data communications links 814 to the primary components of the downstream test, i.e., the TCM 800 and a selected DTM 804. Separate data communication links 814 connect (1) the RCM 812 and the TCM 800 and (2) the RCM 812 and the selected DTM 804. The selected DTM 804 is directed to generate a downstream test signal at the selected carrier frequency and the downstream receiver 902 is instructed to tune to a frequency corresponding to the carrier for the downstream test signal. The RCM 812 also instructs the TCM 800 regarding various test parameters, including the test period interval and the desired type of measurement results. These test parameters can be stored within the memory 914 for subsequent use by the processing unit 912 during an analysis of test results.

The downstream test is conducted by injecting into the downstream receiver 902 a downstream test signal output by the selected DTM 804. The preferred DTM 804 comprises both a pattern generator for generating data pattern and a modulator for modulating an assigned carrier signal with the output of the internal pattern generator. For this downstream test, a data pattern, such as a PRBS sequence, is generated by the selected DTM and is used to modulate the assigned carrier. This injection of the downstream test signal supports an evaluation of the operation of the selected DTM 804 based on the detection of known test signal characteristics by the downstream receiver 904. Consequently, this type of test is generally useful for determining whether the selected DTM 804 has entered a fault state.

Referring now to FIGS. 13, 14 and 16, this downstream test process begins at the START step 1100 and proceeds to step 1102 to define RF characteristics for a selected DTM 804. For the disclosed embodiment, the RCM 812 controls each downstream test by selecting a device to be tested and assigning a particular carrier frequency for transmit operations by the selected DTM 804. A DTM 804 of the HIU 301 is selected as the test device and this DTM is assigned a carrier frequency and a predetermined bit sequence for modulating the carrier frequency. RF switches at the selected DTM are controlled to route the downstream test signal from the selected DTM to the TCM 800 via the downstream test link 810. Preferably, the selected DTM 804 is not at present allocated for conventional communication operations and the selected carrier represents a frequency not allocated for downstream communications between the HIU 301 and a CIU 400. Thus, it will be understood that the downstream test is typically conducted with an off-line DTM of the HIU 301.

In step 1104, the downstream receiver 902 is tuned to a frequency corresponding to the downstream frequency assigned to the selected DTM 804.

In step 1106, the selected DTM 804 generates the downstream test signal by modulating the assigned carrier with an internally-generated data pattern. In turn, the downstream receiver 902 receives the downstream test signal via the test RF combiner 808 and the downstream test link 810. In response, the downstream receiver 904 operates to demodulate the downstream test signal, which is typically represented by a data stream extending for a specified test time period.

In step 1108, the TCM 800 conducts test measurements on the detected downstream test signal based on the test parameters previously specified by the RCM 812 and stored within the memory 914. Measurements can include statistical measurements, such as errored seconds, bit errors, and a bit error rate. The microcontroller 912 can support the analysis of the detected downstream test signal information. The TCM 800 reports the measurement results to the RCM 812 by sending the results as a data packet via the data communication link 814. The RCM 812 stores measurement results within an internal memory storage device, which preferably maintains the records of a database. The database can record the apparent operating state of each DTM 904 based on the results of downstream tests for these DTMs. The RCM 812 can use the database for the allocation of the DTMs 804 to support communications operations. For example, this database can be used to track the operating state of each tested DTM based on the downstream test results associated with these modules. In this manner, the database can be used to avoid allocating DTMs that apparently have entered a fault state based on recorded downstream test results.

In step 1110 a determination is made whether a downstream test should be conducted for another DTM 804 of the HIU 301. If so, the "YES" branch is followed from step 1110 to step 1102 to initiate another downstream test by the TCM 800. However, if the response to the inquiry in step 1110 is negative, the "NO" branch is followed to step 1112 and the test process terminates.

FIG. 17 is a logical flow diagram generally illustrating the steps of a downstream test based on the use of a formatted data pattern supplied to the DTM by the TCM via the RCM. Prior to a review of the downstream test process illustrated in FIG. 17, it will be useful to review the communication exchanges that occur between the TCM 800, a URM 802, and DTM 804. All control commands exchanged between the RCM 812 and a DTM 804 can be handled in a single time slot in a data communication link 814. Therefore, the RCM 812 is responsible for routing appropriate test signals generated by the TCM 800 to a selected DTM 804. In addition, the RCM 812 is responsible for routing the appropriate "recovered" test signal from a URM 802 to the TCM 800. One or more time slots can be used for this exchange of test information.

In contrast to the downstream test described with respect to FIG. 16, the downstream test signal of FIG. 17 comprises a selected carrier modulated with an external data pattern supplied to the TCM 800 through the RCM 812. The RCM 812 controls the selection of the data pattern, preferably a PRBS pattern. In response to a command from the RCM 812, the data pattern is generated by the TCM 800 and then routed to the RCM 812 via a data communication link 814. In turn, the RCM 812 passes the data pattern to a selected DTM.

Referring now to FIGS. 13, 14 and 17, the downstream test process begins at the START step 1200 and proceeds to step 1202 to define RF characteristics for a selected DTM 804. A DTM 804 is selected as the test device and this DTM is assigned a carrier frequency. Preferably, the selected DTM 804 is off-line, i.e., is not at present allocated for conventional communication operations. Likewise, the selected carrier preferably represents a frequency that has not been allocated for downstream communications between the HIU 301 and a CIU 400. Those skilled in the art, however, will appreciate that the test frequency does not necessarily need to be different from one of the "on-line" downstream frequencies. The downstream receiver 902 is tuned to a frequency corresponding to the downstream carrier assigned to the selected DTM 804. The RCM 812 controls the assignment of RF characteristics for the TCM 800 and the DTM 804 by issuing commands to these modules via the data communications links 814.

In step 1204, the RCM 812 instructs the TCM 800 regarding the desired test parameters for the downstream test, including the test period interval and the desired types of measurement results. These test parameters can be stored within the memory 914 for subsequent use by the processing unit 912 during an analysis of test results.

In step 1206, time slot parameters are defined for (1) the signal exchange between the RCM 812 and the TSI (not shown) and (2) the signal exchange between the RCM 812 and the selected DTM 804. The RCM 812 obtains time slot parameters that define time slots that will be used to support exchange of information between the RCM 812 and the DTM 804 during the downstream test. In turn, the RCM 812 advises the DTM 804 that certain time slots will be used for a data exchange during the downstream test. For example, certain time slots must be identified to support the exchange of desired modulation information, i.e., the predetermined data pattern, between the RCM 812 and the DTM 804.

In step 1208, the pattern generator 908 of the TCM 800 generates a test data sequence, which is transported to the RCM 812 via a data communications link 814 in an assigned time slot. In turn, RCM 812 sends the predetermined data pattern to the DTM 804 in one (or more) time slots via a data communication link 814. This predetermined data pattern can be a conventional PRBS pattern or another bit sequence useful for test applications. Significantly, the data pattern represents an known test parameter because the detected downstream test signal will be compared to the known quantity to evaluate the health of the DTM under test.

In step 1210, the selected DTM 804 processes the data pattern and generates a downstream test signal, which represents the selected carrier modulated by the predetermined data pattern. A CIU 400 is programmed to perform a loop back of this downstream test sequence and forwards the downstream test signal to the HIU via an upstream channel. A URM 802 receives the "retransmitted" downstream test signal, i.e., the upstream signal output by the CIU 400, via the upstream channel and forwards the demodulated version of the downstream test signal to the RCM 812.

In step 1212, the RCM 812 routes the demodulated version of the downstream test signal back to the TCM 800. In response, the TCM 800 conducts measurements on the detected downstream test signal and reports the measurement results to the RCM 812. For example, the bit sequence of the detected downstream test signal is compared to the known data sequence of the downstream test signal and analyzed. These test results are carried by the data communication link 814 from the TCM 800 to the RCM 812. The RCM 812 stores the test results within a database that can be used by the RCM 812 for the allocation of the DTMs 804 to support communications operations. This database is typically used to track the operating state of each tested DTM based on the downstream test results associated with these modules.

In step 1214 a determination is made whether a downstream test should be conducted for another DTM 804 of the HIU 301. If so, the "YES" branch is followed from step 1214 to step 1202 to initiate an downstream test for a newly selected DTM. However, if the response to the inquiry in step 1210 is negative, the "NO" branch is followed to step 1216 and the test process terminates.

Those skilled in the art will appreciate that this test can be conducted to test the integrity of one or more specific DS0s without interrupting telephony traffic carried by the network. For this example, only the RF parameters of the CIU would need to be defined for this test, because the remaining parameters of the DTMs and URMs would be defined as part of normal communications operations.

Figure 18:
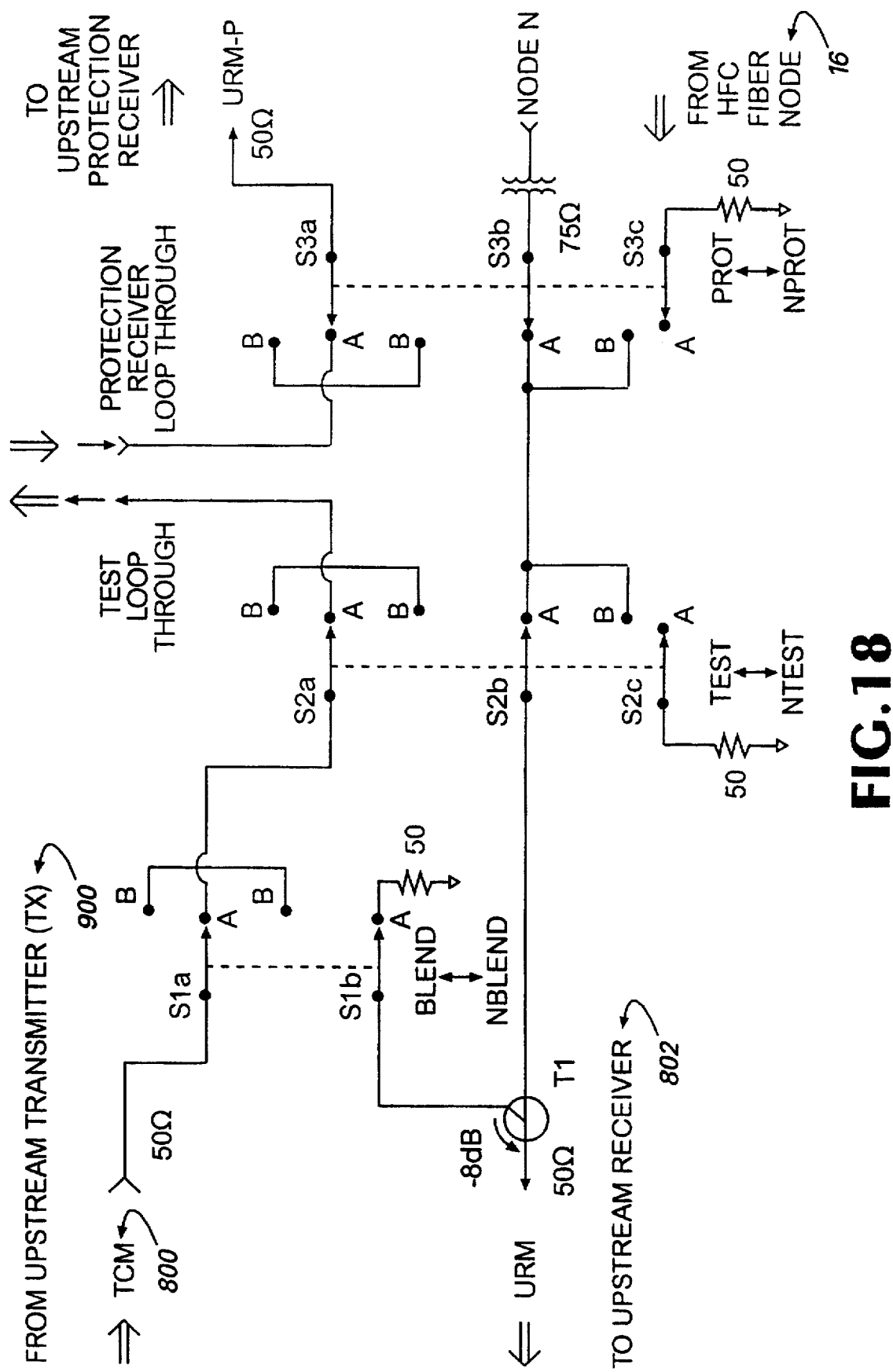
FIG. 18 is a block diagram illustrating a switching system for supporting testing and protection of upstream receiver modules of an embodiment of the present invention.

FIG. 18 is a block diagram illustrating a switch system for supporting testing of an upstream receiver module and for substituting a protection receiver for an upstream receiver module. The switching system for a URM 802 comprises three switches, $S_1$, $S_2$, and $S_3$, and a coupler $T_1$. The switch $S_1$ is responsible for completing the signal path connections required to complete an ingress or a return to service test. The operating state of the switch $S_1$ determines whether the test of the URM is an ingress or a "return to service" test. For the ingress or return-to-service test, the upstream test signal generated by the TCM 800 is passed to the URM 802 by the coupled port of coupler $T_1$ for the ingress test or by the direct-through path input port of coupler $T_1$ for the return-to-service test. The direct through path output port of the coupler $T_1$ supplies signal to the input of the URM. The switch $S_2$ is responsible for completing the signal connections required to conduct a test of the URM 802, and controls the connection of the upstream signal path to the upstream RF input of the URM 802. The switches $S_1$ and $S_2$ operate in tandem to implement a selected test of the URM 802. In contrast, the switch $S_3$ is primarily responsible for completing signals paths for the substitution of a protection module for the URM 802.

The switch $S_1$ is preferably implemented by a double-pole, double-throw relay ($S_{1a}$, $S_{1b}$), whereas the switches $S_2$ and $S_3$ are implemented by triple-pole, double throw relays ($S_{2a}$, $S_{2b}$, and $S_{2c}$; $S_{3a}$, $S_{3b}$, and $S_{3c}$). The coupler $T_1$ is preferably implemented by a directional coupler. The switches $S_1$, $S_2$, and $S_3$ are shown in FIG. 18 as operating in Position A.

Turning now to FIGS. 13, 14, and 18, an ingress test of a selected URM 802 is conducted by directing a switch $S_1$ to transition to Position B and a switch $S_2$ to remain in Position A. The switch $S_1$ connects the TCM 800 to a coupled port of a coupler $T_1$ when the switch $S_1$ transitions from Position A to Position B. The direct path of the coupler $T_1$ is connected between a URM 802 and the common node of the switch $S_{2b}$. The upstream signal path, which is represented by node N, is connected to the switch $S_{2b}$ via an impedance matching transformer and switch $S_{3b}$ operating in Position A. Consequently, upstream signals can enter the input of this URM via a signal path formed by the switches $S_{2b}$ and $S_{3b}$, which are operating in Position A, and the direct path of the coupler $T_1$. The coupler $T_1$ couples the upstream test signal generated by the TCM 800 via the coupled port, thereby combining the upstream test signal with the upstream signals supplied via the upstream signal path. This supports a measurement of upstream link performance at the time of the test.

When the ingress test is not being conducted, the switch $S_{1b}$ remains in Position A to present a 50 ohm termination impedance to the coupled port of coupler $T_1$. A 50 ohm load, which is connected to the Position A node of switch $S_{1b}$ supports the presentation of this desired impedance level.

To perform a return-to-service test, injecting only an upstream test signal into the URM 800, the switch $S_1$ remains in Position A and the switch $S_2$ transitions to Position B. In this manner, the TCM 800 is connected to the URM 802 via a signal path performed by the switch $S_{1a}$, the switches $S_{2a}$ and $S_{2b}$, and the direct path of the coupler $T_1$. A 50 ohm impedance is presented by the switch $S_{2c}$ when this switch enters Position B thereby presenting a desired impedance level to the switch $S_{3b}$. By directing the switch $S_{2b}$ to transition to the Position B, the upstream signal path is disconnected from the URM 802.

In view of the foregoing, it will be appreciated that the URM 802 can be tested by transitioning the switch $S_2$ from Position A to Position B. Moreover, the operating state of the switch $S_1$ determines whether the test of the URM is an ingress or a "return to service" test. The ingress test can be conducted when the switch $S_1$ transitions to Position B, whereas the return to service test is completed when the switch $S_1$ remains in Position A. The switch $S_3$ is primarily responsible for completing signal paths for substitution of a protection module for a URM 802. The URM 802 remains "in line" with upstream signal path while the switch $S_3$ remains in Position A.

Returning now to the protection receiver, the operating state of the switch $S_3$ determines whether the protection receiver is placed "in line" as a substitute for a URM that has entered a fault state. Specifically, the URM 802 in FIG. 18 is disconnected from the node N when the switch $S_3$ transitions to Position B. This allows the protection receiver to receive upstream signals that normally would be routed to the URM 802 in the event that the switch $S_3$ had remained in Position A. When the switch $S_3$ operates in Position B, the protection receiver is connected to the node N formed by the switch $S_{3a}$ and the switch $S_{3b}$. In addition, the switch $S_{3c}$ presents a 50 ohm impedance level to the switch $S_{3b}$ when the switch $S_3$ transitions to Position B.

The Test Loop Through and Protection Receiver Loop Through ports allow other similar switching systems as depicted in FIG. 18 to be cascaded with the same TCM 800 and Upstream Protection Receiver in a 1:N protection system. When switches $S_2$ and $S_3$ are in Position A, the TCM 800 and the Upstream Protection Receiver signals pass through the switch system in order to service other equipment.

Although FIG. 18 provides a representative illustration of the switching system for testing and protecting a single URM, it will be appreciated that this switching system can be extended for use with other URMs of the HIU 301. For example, a switching matrix can be constructed to support the switching operations conducted by the switches $S_1$, $S_2$, and $S_3$ for use with the multiple URMs of the HIU 301.

While there has been shown and described the preferred embodiments of the invention, it will be evident to those skilled in the art that various modifications and changes may be made thereto without departing from the spirit and scope of the invention as set forth in the appended claims and equivalents thereof.

What is claimed is:

1. A telephony system for communicating telephony signals between a telephony network and subscribers to the telephony system, including a broadband communication network having a headend for communicating to the subscribers, the headend comprising:

a modulator, coupled between the telephony network and the broadband communications network, for modulating the telephony signals from the telephony network on a carrier in a first band of the broadband communication network;

channel assignment equipment for assigning telephony signals from one or more subscribers to a selected frequency subband in a second band of the broadband communication network;

a demodulator, coupled between the telephony network and the broadband communications network, for demodulating the telephony signals in said selected frequency subband and coupling them to the telephony network; and a test system for evaluating the operating state of the modulator and the demodulator.

2. The system of claim 1, wherein the test system comprises:

an upstream transmitter for transmitting an upstream test signal to the demodulator to evaluate the operating state of the demodulator;

a downstream receiver for receiving a downstream test signal transmitted by the modulator to evaluate the operating state of the modulator;

a test controller for controlling the upstream transmitter and the downstream receiver.

3. The system of claim 2, wherein the upstream transmitter comprises:

a data pattern generator for generating a data pattern; and a test modulator for modulating a carrier with the data pattern to generate the upstream test signal.

4. The system of claim 3, wherein the demodulator outputs a detected upstream test signal to the test system in response to receiving the upstream test signal, and the test controller compares the detected upstream test signal to the data pattern to collect error measurements.

5. The system of claim 4, wherein the test controller forwards the error measurements to a controller, and the controller updates a database defining the operating state of the demodulator based on the error measurements.

6. The system of claim 5, wherein the downstream receiver outputs a detected downstream test signal to the test controller in response to receiving the downstream test signal, and the test controller forwards error measurements to the controller in response to analyzing the detected downstream test signal.

7. The system of claim 6, wherein the controller updates a database defining the operating state of the modulator in response to the error measurements.

8. The system of claim 1, wherein the test system is operative to conduct an upstream test by injecting an upstream test signal into the demodulator to evaluate the operating state of the demodulator.

9. The system of claim 8, wherein the test system is operative to conduct an upstream test by injecting an upstream test signal and the telephony signals in said selected frequency subband into the demodulator to evaluate the operating state of the demodulator and the status of said selected frequency subband.

10. The system of claim 1, wherein the test system is operative to conduct a downstream test by receiving a downstream test signal generated by the modulator to evaluate the operating state of the modulator.

11. The system of claim 2, wherein the upstream test signal comprises a carrier modulated by a known data pattern, and the test system generates test measurements in response to conducting the upstream test, the test measurements defining the results of comparing the known data pattern to the upstream test signal demodulated by the demodulator.

12. The system of claim 11, wherein the known data pattern is generated by a pattern generator connected to the upstream transmitter.

13. The system of claim 1, wherein the test system comprises:

an upstream transmitter for transmitting an upstream test signal to the demodulator to evaluate the operating state of the demodulator;

a downstream receiver for receiving a downstream test signal transmitted by the modulator to evaluate the operating state of the modulator;

a test controller for controlling the upstream transmitter and the downstream receiver; and a coupler, characterized by a direct path connected between the broadband communication network and the demodulator and a coupled port connected to the upstream transmitter, for coupling the upstream test signal to the demodulator via the coupled port and passing the telephony signals in the selected frequency subband to the demodulator via the direct path.

14. The system of claim 13, wherein the modulator comprises a test output and a primary output, the primary output supporting distribution of the carrier in the first band of the broadband communication network, and the test output supporting distribution of the downstream test signal.

15. The system of claim 14, wherein the upstream transmitter comprises:

a data pattern generator for generating a data pattern; and a test modulator for modulating a carrier with the data pattern to generate the upstream test signal.

16. The system of claim 1, wherein the broadband communication network includes a subscriber terminal for demodulating the telephony signals in the first band of broadband communication network and coupling them to the subscriber, and for modulating the telephony signals from the subscriber in the selected frequency subband in the second band of the broadband communication network for communication to the headend.

17. The system of claim 1, wherein the broadband communication network is a bidirectional network, and further comprising equipment for providing television program signals in said first band to subscribers.

18. The system of claim 1, wherein the broadband communications network further comprises:

a frequency agile modulator located at the subscriber operative to change the frequency at which telephony signals are being communicated to the headend from a first frequency subband to a second frequency subband in response to a command received from the channel assignment equipment of the headend.

19. A test system for a telephony system for communicating telephony signals between a telephony network and subscribers to the telephony system, including a broadband communication network having a headend for communicating to the subscribers, the headend comprising a modulator, coupled between the telephony network and the broadband communications network, for modulating the telephony signals from the telephony network on a carrier in a first band of the broadband communication network, and a demodulator, coupled between the telephony network and the broadband communications network, for demodulating telephony signals from subscribers in a selected frequency subband in a second band of the broadband communications network and coupling them to the telephony network, the test system comprising:

an upstream transmitter for transmitting an upstream test signal to the demodulator to evaluate the operating state of the demodulator;

a downstream receiver for receiving a downstream test signal transmitted by the modulator to evaluate the operating state of the modulator; and a test controller for controlling the upstream transmitter and the downstream receiver.

20. The system of claim 19, wherein the upstream transmitter comprises:

a data pattern generator for generating a data pattern; and a test modulator for modulating a carrier with the data pattern to generate the upstream test signal.

21. The system of claim 20, wherein the demodulator outputs a detected upstream test signal to the test system in response to receiving the upstream test signal, and the test controller compares the detected upstream test signal to the data pattern to generate error measurements.

22. The system of claim 21, wherein the test controller forwards a error measurements to the controller, and the controller updates a database defining the operating state of the demodulator based on the error measurements.

23. The system of claim 22, wherein the downstream receiver outputs a detected downstream test signal to the test controller in response to receiving the downstream test signal, and the test controller forwards error measurements to the controller in response to analyzing the detected downstream test signal.

24. The system of claim 23, wherein the controller updates a database defining the operating state of the modulator in response to the error measurements.

25. The system of claim 19, wherein the upstream test signal comprises a carrier modulated by a known data pattern, and the test system generates test measurements in response to conducting the upstream test, the test measurements defining the results of comparing the known data pattern to the upstream test signal demodulated by the demodulator.

26. The system of claim 25, wherein the known data pattern is a PRBS pattern generated by a pattern generator connected to the upstream transmitter.

27. The systems of claim 20, wherein the upstream test signal is combined with the telephony signals from subscribers in a portion of the selected frequency subband of the second band to support an examination of the operating state of the demodulator and the status of the portion of the selected frequency subband.

28. For a telephony system for communicating telephony signals between a telephony network and subscribers to the telephony system, including a broadband communication network having a headend for communicating to the subscribers, the headend comprising a modulator, coupled between the telephony network and the broadband communications network, for modulating the telephony signals from the telephony network on a carrier in a first band of the broadband communication network, and a demodulator, coupled between the telephony network and the broadband communications network, for demodulating telephony signals from subscribers in a selected frequency subband in a second band of the broadband communications network and coupling them to the telephony network, a method for testing the operating state of the headend, comprising the steps:

evaluating the operating state of the demodulator by:
generating a data pattern;
modulating a carrier with the data pattern to generate a upstream test signal;
transmitting an upstream test signal to the demodulator;
receiving a detected upstream test signal from the demodulator;
comparing the detected upstream test signal to the data pattern to generate error measurements that support an evaluation of the operating state of the demodulator.

29. The method of claim 28 further comprising the step of updating a database defining the present operating state of the demodulator based on the error measurements.

30. The method of claim 28, further comprising the step:

evaluating the operating state of the modulator by:
using the modulator to generate a downstream test signal;
receiving the downstream test signal;
outputting a detected downstream test signal in response to receiving the downstream test signal; and
conducting error measurements in response to the detected downstream test signal.

31. The method of claim 30 further comprising the step of updating a database defining the present operating state of the modulator in response to the error measurements.

32. The method of claim 30, wherein the downstream test signal comprises a carrier modulated by a known data pattern, and the step of conducting test measurements comprises:

comparing the known data pattern to the detected downstream signal.

33. For a telephony system for communicating telephony signals between a telephony network and subscribers to the telephony system, including a broadband communication network having a headend for communicating to the subscribers, the headend comprising a modulator, coupled between the telephony network and the broadband communications network, for modulating the telephony signals from the telephony network on a carrier in a first band of the broadband communication network, and a demodulator, coupled between the telephony network and the broadband communications network, for demodulating telephony signals from subscribers in a selected frequency subband in a second band of the broadband communications network and coupling them to the telephony network, a method for testing the operating state of the headend, comprising the steps:

evaluating the operating state of the demodulator by:
generating a predetermined data pattern;
modulating a carrier with the predetermined data pattern to generate a upstream test signal;
transmitting an upstream test signal to the demodulator;
receiving a detected upstream test signal from the demodulator; and
comparing the detected upstream test signal to the data pattern to generate error measurements that support an evaluation of the operating state of the demodulator; and evaluating the operating state of the modulator by:
using the modulator to generate a downstream test signal;
receiving the downstream test signal;
outputting a detected downstream test signal in response to receiving the downstream test signal; and
conducting error measurements in response to the detected downstream test signal.

34. The method of claim 33 further comprising the step of updating a database defining the present operating state of the demodulator based on the error measurements, and updating a database defining the present operating state of the modulator in response to the error measurements.

* * * * *